US012753691B2

(12) United States Patent
AlBahrani et al.

(10) Patent No.: US 12,753,691 B2
(45) Date of Patent: Oct. 6, 2026

(54) SYSTEMS AND METHODS FOR DETERMINING A WELLBORE-CASING VOLUME

(71) Applicant: Saudi Arabian Oil Company, Dhahran (SA)

(72) Inventors: Hussain AlBahrani, Qatif (SA); Omar Alblushi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 290 days.

(21) Appl. No.: 18/428,078

(22) Filed: Jan. 31, 2024

(65) Prior Publication Data

US 2025/0243745 A1 Jul. 31, 2025

(51) Int. Cl.

*E21B 47/003* (2012.01)
*G01N 15/08* (2006.01)
*G06T 7/62* (2017.01)

(52) U.S. Cl.

CPC ........... *E21B 47/003* (2020.05); *G01N 15/08* (2013.01); *G06T 7/62* (2017.01); *G01N 2015/0846* (2013.01)

(58) Field of Classification Search

CPC .. E21B 47/002; E21B 47/0025; E21B 33/138; E21B 47/007; E21B 47/06; E21B 47/07; E21B 17/02; E21B 41/00; E21B 47/003; E21B 47/09; G01V 11/002; G01V 20/00; G01V 8/00; G01V 1/306; G01V 2210/6244; G01V 3/20; G01V 3/24; G01V 3/30; G01B 11/024; G01N 15/08; G01N 15/088; G01N 2015/0846; G06T 17/05; G06T 19/00; G06T 2200/04;

(Continued)

(56) References Cited

U.S. PATENT DOCUMENTS

| | | | |
|---|---|---|---|
| 2,926,192 | A | 2/1960 | Gavlin et al. |
| 6,078,867 | A | 6/2000 | Plumb et al. |

(Continued)

FOREIGN PATENT DOCUMENTS

| | | | | |
|---|---|---|---|---|
| CA | 2926192 | | 4/2015 | |
| CA | 3099245 | A1 * | 11/2019 | ......... E21B 47/0025 |

(Continued)

OTHER PUBLICATIONS

U.S. Appl. No. 18/436,847, Bokhamsin et al., "Designing Variable Strength Well Casings," filed Feb. 8, 2024, 50 pages.

*Primary Examiner* — Kristina M Deherrera
*Assistant Examiner* — Gedeon M Kidanu
(74) *Attorney, Agent, or Firm* — Fish & Richardson P.C.

(57) ABSTRACT

A method for determining the volume of a wellbore for hydrocarbon extraction in a subsurface. The method includes at each depth of the wellbore, obtaining image data which characterizes the physical properties of the subsurface, calibrating the image data with mechanical caliper or resistivity measurements, determining a radial distance of the wellbore wall, and determining a cross section image of the wellbore wall. The method includes generating a three-dimensional image of the wellbore wall from the cross section images at each depth of the wellbore, determining a volume of a space between the wellbore wall and the predicted location of an internal casing, and determining the amount of material required to fill the volume.

20 Claims, 20 Drawing Sheets

(58) Field of Classification Search
CPC ............. G06T 2200/08; G06T 2215/16; G06T 2219/2012; G06T 7/20; G06T 7/97; G06V 10/7515
See application file for complete search history.

(56) References Cited

U.S. PATENT DOCUMENTS

| | | | |
|---|---|---|---|
| 7,279,677 B2 | 10/2007 | Ellis et al. | |
| 7,630,872 B2 | 12/2009 | Xia et al. | |
| 7,933,166 B2 * | 4/2011 | Goodman | G06T 7/97 702/6 |
| 10,197,549 B2 | 2/2019 | Thomas et al. | |
| 10,634,807 B2 | 4/2020 | Tang et al. | |
| 10,641,079 B2 * | 5/2020 | Aljubran | E21B 47/06 |
| 10,927,618 B2 | 2/2021 | AlBahrani et al. | |
| 10,941,644 B2 | 3/2021 | Aljubran et al. | |
| 10,982,124 B2 | 4/2021 | AlBahrani et al. | |
| 11,125,899 B2 * | 9/2021 | Wheelock | G01V 20/00 |
| 11,261,730 B2 | 3/2022 | AlBahrani et al. | |
| 11,624,251 B2 | 4/2023 | Aljubran et al. | |
| 11,954,800 B2 | 4/2024 | AlBahrani et al. | |
| 2007/0007967 A1 | 1/2007 | Itskovich et al. | |
| 2009/0259446 A1 | 10/2009 | Zhang et al. | |
| 2010/0122847 A1 | 5/2010 | Xia et al. | |
| 2019/0257973 A1 | 8/2019 | AlBahrani et al. | |
| 2023/0203904 A1 | 6/2023 | Aljubran et al. | |
| 2023/0384479 A1 | 11/2023 | Hamid et al. | |
| 2024/0011392 A1 | 1/2024 | AlBahrani | |

FOREIGN PATENT DOCUMENTS

| | | |
|---|---|---|
| WO | WO 2015060846 | 4/2015 |
| WO | WO 2017082860 | 5/2017 |

* cited by examiner

600

SYSTEMS AND METHODS FOR DETERMINING A WELLBORE-CASING VOLUME

TECHNICAL FIELD

The present disclosure relates to wellbore drilling, such as for hydrocarbon extraction. More specifically, the disclosure describes techniques for determining a volume of a wellbore outside of a casing inserted into the wellbore.

BACKGROUND

Logging while drilling (LWD) is a technique of conveying well logging tools into the well borehole downhole as part of the bottom hole assembly (BHA). The well logging tools measure properties of a geological formation while drilling through it. Some LWD tools transmit partial or complete measurement results to the surface while still in the borehole. Complete measurement results can be downloaded from LWD tools after they are pulled out of hole. LWD tools can include acoustic calipers which emit pulsed acoustic energy to image the borehole wall in the presence of opaque drilling muds.

SUMMARY

The present disclosure describes techniques that can be used for estimating a precise volume of a wellbore including a region between a wall of the wellbore and an outer surface of a casing that is aligned along the axis of the wellbore. A data processing system is configured to accurately model the wellbore, which can be non-uniform in shape. The data processing system is configured to generate data representing an exact volume of the wellbore. The data processing system can determine a volume between the casing in the wellbore (or to be inserted into the wellbore) and the wellbore itself.

The data processing system determines the volume of the wellbore based on processing image data (such as ultrasonic images or resistivity-based images). The data processing system converts two-dimensional (2D) formation sonic-image log pictures into three dimensional (3D) models of the wellbore. The data processing system converts the images data to a 3D model by iterating over a length of the wellbore and converting the image data to estimates of the radial depth of the wellbore and generating a series of wellbore cross sections. The data processing system can generate data representing a difference in distance between the wall of the wellbore and the planned casing or liner outside diameter. The distance between the outside of the planned casing or liner and the wall represents the amount of cement required to fill up the space of the annulus.

The one or more embodiments described in this specification can enable one or more of the following advantages. The data processing system can determine an exact volume between the wall of the wellbore and an outer surface of a casing, such as one that is aligned along the axis of the wellbore. The data processing system is configured to generate an accurate estimation of an amount of material to fill the volume. For example, the volume between the wall of the wellbore and the outer surface of the casing can be sealed with cement.

The data processing system can generate a precise estimate of how much cement is required to fill the wellbore. The accurate estimation can reduce costs for drilling and can improve operational estimates for budgeting. In addition, predictions of tight spots within a wellbore can enable a drilling team to widen the wellbore at the tight spots to prevent potential blockages that may impede inserting the sealing material once the casing is inserted into the wellbore. Because drilled wellbores tend to deviate significantly from the desired circular shape due to wellbore instabilities, hole cleanings issues, reaming operations, and swelling clays. The discrepancy can lead to miscalculating the cement volume requirements, which might lead to gaps in the annular spaces behind a casing. The data processing system can ensure that such gaps are not present and avoid precursors to development of undesired casing-casing annular pressure which allow for communication with fluid saturated formations.

The data processing system can be calibrated by a generalized calibration method that allows the data processing system to generate the precise evaluation of wellbore volumes using the calibrated tool. The generalized calibration method can be applied to a particular instance of the data processing system without requiring the data processing system to gather data or repeat time-sensitive calibration steps. For example, the calibration technique can be applied to each new instance of the data processing system or similar drilling tool for the same or new wellbore environments.

Embodiments of these systems and methods can include one or more of the following features.

In a general aspect, a method for determining the volume of a wellbore for hydrocarbon extraction in a subsurface comprises for each of a plurality of depths in the wellbore, obtaining image data comprising, an image representing subsurface properties around a casing in the wellbore; calibrating the image data including the image, the calibrating configured to adjust at least one subsurface property assigned to at least one pixel in the image; determining, from the adjusted subsurface property for the image, a radial estimation of a cross section of the wellbore at a given depth; generating, based on the wellbore cross section of each image, a three-dimensional model of the wellbore; and determining, based on the volume, an amount of material to fill the volume for sealing the casing when the casing is place inside the wellbore.

In some implementations, the image data comprises at least a portion of logging-while-drilling (LWD) data obtained during drilling of the wellbore into the subsurface.

In some implementations, the method comprises determining a bit size of a bit configured to drill the wellbore and calibrating the image data by assigning a physical dimension to pixel sizes in the images based on the bit size of the bit.

In some implementations, the method comprises determining a direction of a maximum in-situ stress in the wellbore; and calibrating the image data by correlating the direction of the maximum in-situ stress with directions of wellbore enlargements or breakouts represented in the image data.

In some implementations, the method comprises receiving a multi-arm mechanical caliper log measurement; and calibrating the image data by determining a radial depth corresponding to a breakout zone represented in the image data.

In some implementations, the image data comprise ultrasonic log images.

In some implementations, the image data comprise resistivity log images, where the method further comprises determining a range of circumferential angles with low image resolution; and calibrating the image data by correlating the region of low image resolution with a wellbore enlargement.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The details of one or more embodiments are set forth in the accompanying drawings and the description below. Other features and advantages will be apparent from the description and drawings, and from the claims.

DESCRIPTION OF DRAWINGS

Like reference numbers and designations in the various drawings indicate like elements.

DETAILED DESCRIPTION

Figure 1:
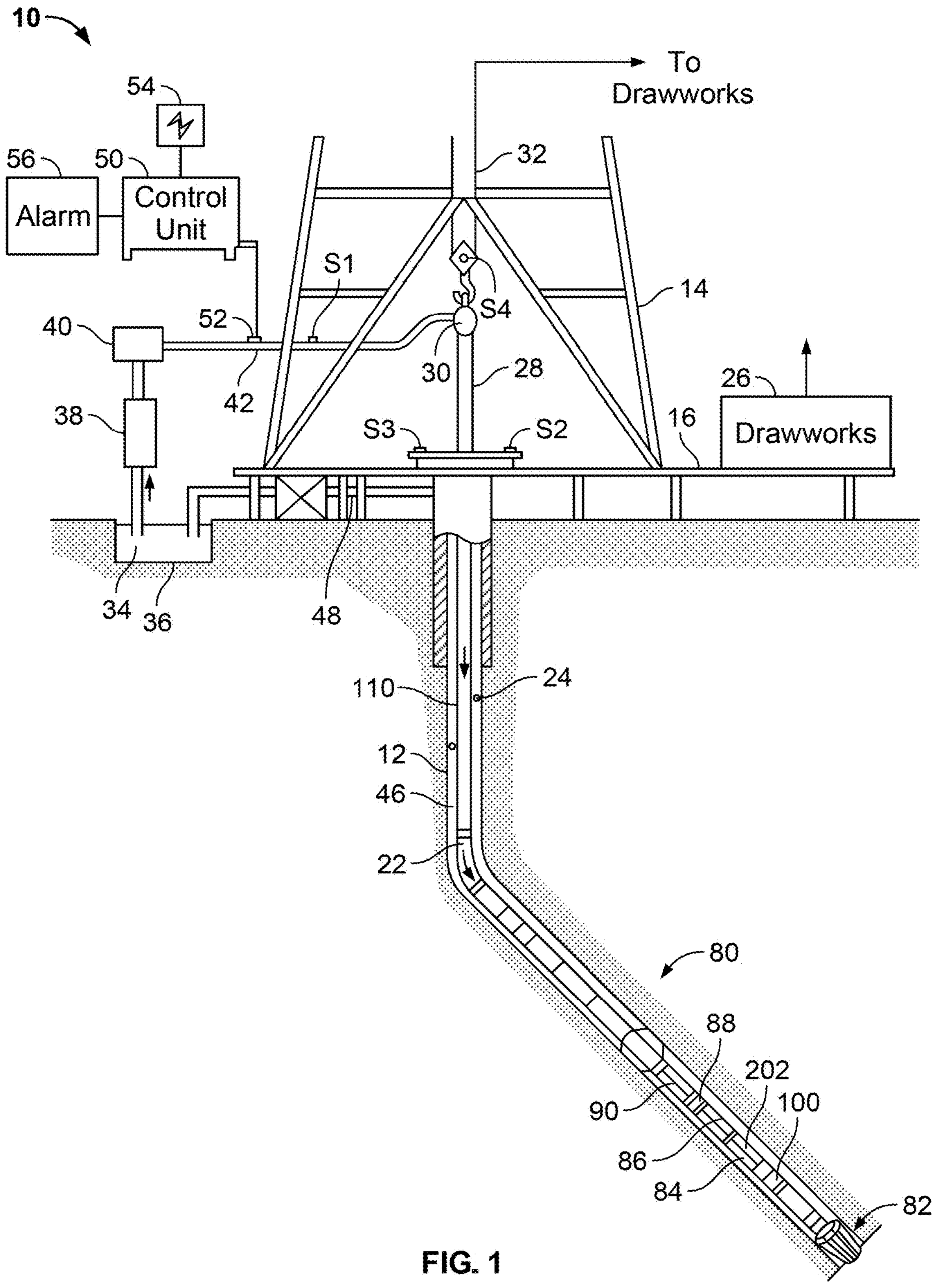
FIG. 1 is an illustration of an example well drilling rig.

The systems and processes described herein are configured for accurately modeling a non-uniform wellbore and to output data representing an exact size of the wellbore. The estimated volume by the data processing system enables accurate calculation of an amount of material, such as cement, that is required to seal an annular space between a casing string and the wellbore wall.

A data processing system is configured to execute an image processing process configured to convert two-dimensional (2D) formation sonic-image log pictures into three-dimensional (3D) models of the wellbore. The data processing system performs the process by performing the following actions. The data processing system receives image data from log data. The image data represents a physical configuration of the wellbore. The data processing system converts, from the image data, rows of pixels in the log image into respective radial distances for the wellbore. The data processing system generates cross section data based on the radial data. The data processing system merges the radial data together to generate a string of radial estimates along an axis of the wellbore. The string of radial estimates represents the 3D model of the wellbore. Based on the 3D model, the data processing system determines a distance difference between a first distance of a wall of the wellbore and a second distance for a planned casing or liner outside diameter. The data processing system can determine, from a set of values of distance differences for the wellbore, an amount of material, such as cement, that is required to fill up a volume of the annulus between the casing and wellbore wall.

During drilling operations, as the wellbore is being drilled, the wellbore is not typically in-gauge. The wellbore can experience a combination of in-situ and drilling fluid stresses. Deviations in the wellbore size can occur, and the wellbore can become non-circular and/or non-uniform. For example, when the walls of the wellbore experience stresses above a yield strength of the formation rocks, the rocks break off and the wellbore is enlarged, resulting in the non-uniform wellbore shape. As a result, due to chemical processes or the geometry of the wellbore, the wellbore may have a tight spot once the casing is introduced. The deviations in wellbore size can cause blockages or other obstacles to sealing the borehole annulus when the time comes to cement a casing string. Enlargements increase the returning drilling fluid flow area (within the annulus), which leads to a lower flow velocity. The lower flow velocity reduces the cleaning efficiency of the flowing drilling fluid.

The data processing system is configured for efficient placement of cement in the annular spaces behind a casing for well construction operations. The data processing system can enable a drilling team to avoid any misplacement of cement, and therefore avoid chronic wellbore integrity issues that can jeopardize a well objective and cut short a lifespan of the well. The estimation of the cement volume requirements by the data processing system enables efficient cementing jobs to be performed. The volume estimate of the data processing system described herein is more precise than approaches for cement volume requirement estimation that include calculating a regular cylindrical volume for a space confined between a casing tubular and the drilled wellbore wall. Drilling engineers having the precise estimate can accurately add extra volume for a shoe track, if needed, without assuming that the drilled wellbore is in a cylindrical shape. The data processing system can accommodate non-uniform shapes of drilled wellbores.

FIG. 1 illustrates a directional wellbore being drilled by a drilling system 10 using a drill string with a bottom hole assembly (BHA) 80 including LWD tools. The system 10 includes a drill string 22 with a jointed tubular string 24 extending downward from a rig 14 into the wellbore 12. The drill bit 82, attached to the drill string end, is rotated to drill the wellbore 12. The drill string 22 is coupled to a draw works 26 via a kelly joint 28, swivel 30 and line 32 through a pulley (not shown).

In one configuration, the BHA 80 includes a drill bit 82, a drilling motor 84, a sensor sub 86, a bidirectional communication and power module (BCPM) 88, and a formation evaluation (FE) sub 90. To enable power and/or data transfer to the other making up the BHA 80, the BHA 80 includes a power and/or data transmission line (not shown). The steering device 100 may be operated to steer the BHA 80 along a selected drilling direction by applying an appropriate tilt to the drill bit 82.

During drilling operations, a suitable drilling fluid 34 from a mud pit 36 is circulated under pressure through a channel in the drill string 22 by a mud pump 34. The drilling fluid passes from the mud pump 38 into the drill string 22 via a desurger 40, fluid line 42 and Kelly joint 28. The drilling fluid 34 is discharged at the wellbore bottom through an opening in the drill bit 82. The drilling fluid 34 circulates uphole through the annular space 46 between the drill string 22 and the wellbore 12 and returns to the mud pit 36 via a return line 48. The drilling fluid acts to lubricate the drill bit 82 and to carry wellbore cutting or chips away from the drill bit 82. A sensor S1 typically placed in the line 42 provides information about the fluid flow rate. A surface torque sensor S2 and a sensor S3 associated with the drill string 22 respectively provide information about the torque and rotational speed of the drill string 22. Additionally, sensor S4 associated with line 29 is used to provide the hook load of the drill string 22.

The drill string 22 can be contained within a casing 110 that is inserted within the wellbore. In some implementations, a material is filled in the annular volume between the outside of the casing and the wall of the wellbore. For example, cement can be filled in the annular volume to seal the region between the outside edge of the casing and the wellbore wall.

A surface controller 50 receives signals from the downhole sensors and devices via a sensor 52 placed in the fluid line 42 and signals from sensors S1, S2, S3, hook load sensor S4 and other sensors used in the system The sensor sub 86 includes a ultrasonic caliper in addition to other sensors.

The bidirectional data communication and power module ("BCPM") 88 transmits control signals between the BHA 80 and the surface as well as supplies electrical power to the BHA 80. For example, the BCPM 88 provides electrical power to the steering device 100 and establishes two-way data communication between the processor 202 and surface devices such as the controller 50. In one embodiment, the BCPM 88 generates power using a mud-driven alternator (not shown) and the data signals are generated by a mud pulser (not shown). In addition to mud pulse telemetry, other suitable two-way communication links may use hard wires (e.g., electrical conductors, fiber optics), acoustic signals, EM or RF. Of course, if the drill string 22 includes data and/or power conductors (not shown), then power to the BHA 80 may be transmitted from the surface.

Figure 2:
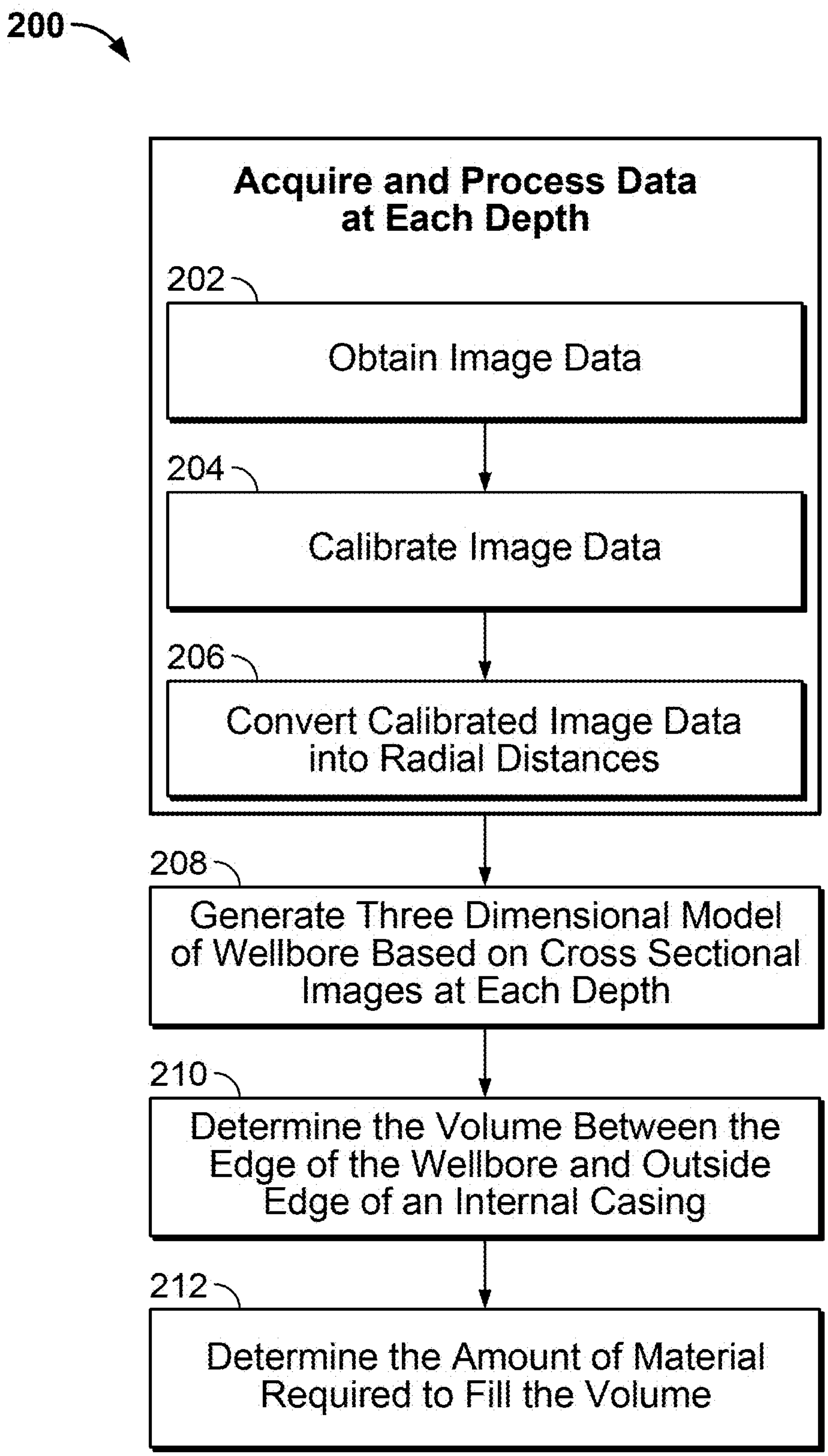
FIG. 2 shows a block diagram illustrating an example process for evaluating the volume of a wellbore.

FIG. 2 shows a block diagram illustrating an example process 200 for determining the amount of material required to fill the volume between the edge of a wellbore and the outer edge of an internal casing placed inside the wellbore, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

The process 200 includes a system that obtains (202) image data at multiple depths along the axis of the wellbore. The image data can include data that characterizes the physical structure and location of the wall of a wellbore from imaging sources that can include ultrasonic well logs and resistivity well logs. The image of the wellbore at a specific depth includes a representation of the wall of the wellbore at a plurality of angles around the axis of the wellbore.

For example, ultrasonic well logs can include the acoustic amplitude of a reflected acoustic signal at each circumferential angle. Ultrasonic transducers emit high-frequency acoustic waves into the walls of the wellbore, where the waves travel through the geological formation and are reflected back to a detector by different layers of rock and fluid. In some implementations, the ultrasonic transducer and detector are positioned on the drilling mechanism, allowing the well log to be captured while drilling (logging-while-drilling, LWD). The properties of the layers, e.g., density, location, and porosity, affect the speed and amplitude of the reflected waves.

As another example, resistivity well logs represent the electrical resistance between two closely spaced conducting elements oriented at a specific circumferential angle around the axis of the wellbore. Resistivity well logs are based on the principle that different geological materials have different resistivities. In some implementations, the resistivity logging tool includes a series of electrodes positioned at a range of circumferential angles around the wellbore. By applying a current between the electrodes, the measurement of electric potential between the electrodes provides a measure of electrical resistivity of the material between the electrodes.

The system can calibrate (204) the image data at each depth along the axis of the wellbore. The calibration can include the determination of a reference uniform radius defined by one half the bit size, measurements from a multi-arm mechanical caliper log to define the maximum and minimum radii throughout the wellbore, and the determination of the maximum in-situ stress direction of the subsurface formation.

The bit size defines the nominal diameter of the wellbore. In some regions of the wellbore, the wellbore can be over-gauge or under-gauge. An over-gauge region, or a breakout, refers to a region in which the wellbore diameter is larger than the nominal diameter defined by the diameter of the drill bit. An over-gauge region can be due to unstable ground conditions, mechanical issues with the drilling equipment, or fractures. An under-gauge region, or a tight spot, refers to a region in which the wellbore diameter is smaller than the nominal diameter defined by the diameter of the drill bit. An under-gauge region can be due to the bit not cutting effectively or inadequate drilling parameters, e.g., low revolutions per minute.

The system can use multi-arm mechanical caliper log data to define the maximum and minimum radii throughout the entire depth of the wellbore. In some implementations, multi-arm mechanical calipers can include a central body with several articulated arms that can extend outward to the wall of the wellbore. The arms can be fitted with measuring sensors at their tips. As the tool is pulled up the wellbore, the arms can move in and out to conform to the wellbore's contours, and the sensors can measure the distance from the central body of the tool to the wellbore wall. The data processing system can determine a profile of the wall of the wellbore by analyzing the measurement of each independent arm at multiple depths. Since there is a discrete number of arms on a typical multi-arm mechanical caliper, the number of radial measurements and radial resolution can be limited.

The system uses multi-arm mechanical caliper data to determine the maximum and minimum radii of the wellbore, which can correlate the maximum and minimum ranges of the ultrasonic image logs to the maximum and minimum values of the radius of the wellbore wall. For example, the system can assign the maximum acoustic amplitude to the minimum measured radius, and the minimum acoustic amplitude to the maximum measured radius to define the range of expected values of the acoustic measurement.

The system may require knowledge of the direction of maximum in-situ stress of the subsurface to accurately calibrate the images of the wellbore. The direction of maximum in-situ stress is the direction of maximum stress of the overall subsurface formation, independent of drilling activity. The data processing system uses the maximum in-situ stress direction to correlate the direction of wellbore enlargements or breakouts as observed in the image.

For each pixel of the image data, the system can convert (206) the calibrated image data into radial distances at each depth. In some implementations, the system can assign a radial distance to a bright spot on the image or a pixel value that is defined to correspond to a point that is geometrically closer to the center of the wellbore than other points.

In some implementations, the data processing system can acquire image data that can be interpreted as two-dimensional image slices of the wellbore at depths along the axis of the wellbore, e.g., the slices can include pixel values distributed along the radial and azimuthal dimensions that correspond to the wall of the wellbore. The data processing system can stack the two-dimensional slices along the axis of the wellbore to form a three-dimensional image of the entire wellbore, as illustrated below in reference to FIG. 12. The data processing system can generate (208) a three-dimensional model of the wellbore based on cross sectional images at each depth along the axis of the wellbore. With a three-dimensional model of the wellbore, the system can estimate the total volume of the wellbore.

In addition to estimating the volume of the wellbore, the system can determine (210) the volume between the edge of the wellbore and the outside edge of an internal casing that is placed within the wellbore aligned along its axis. Furthermore, the system can determine (212) the amount of material required to fill the volume between the edge of the wellbore and the outside edge of an internal casing.

Figure 3:
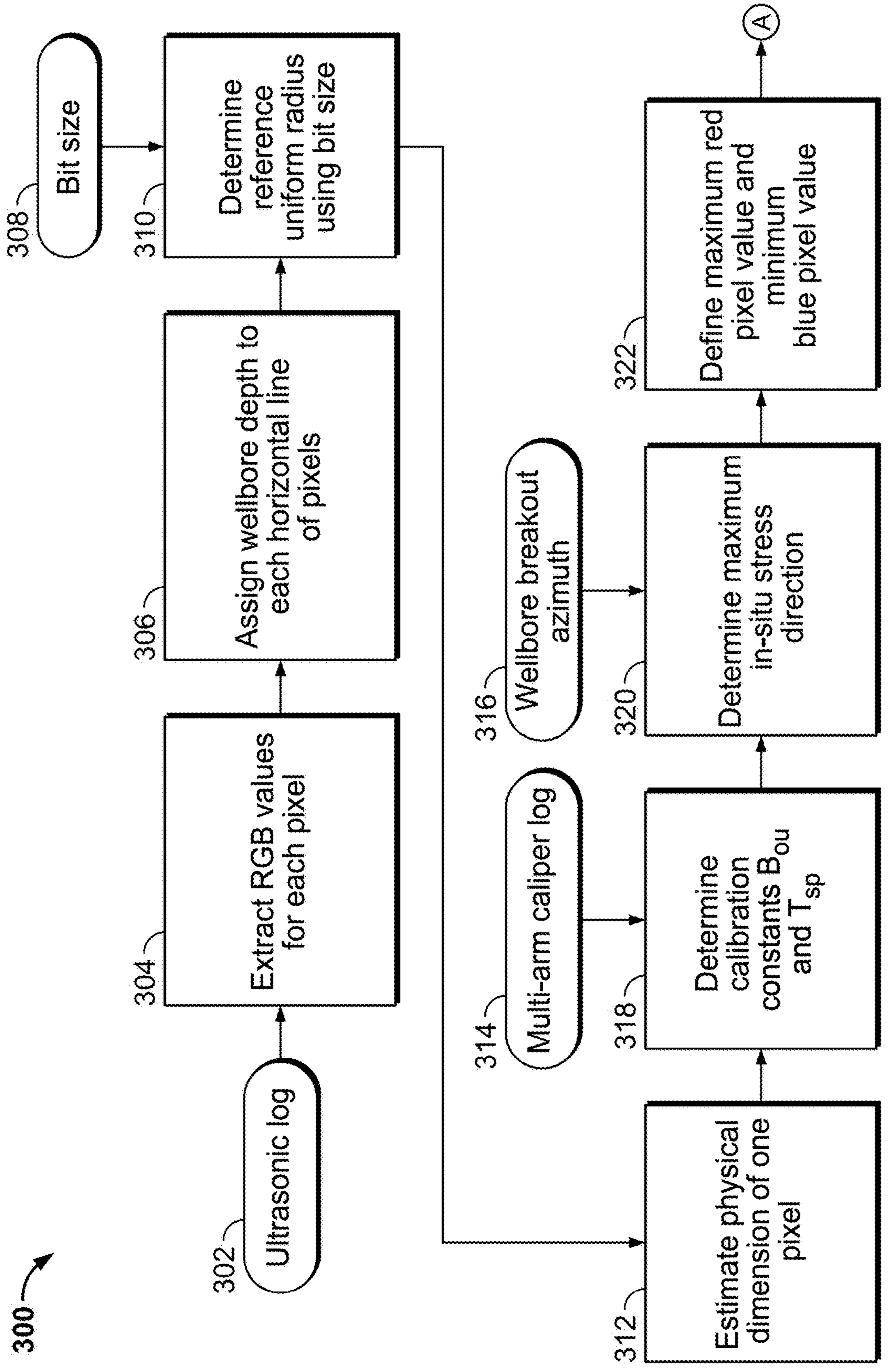
FIG. 3 shows a block diagram illustrating an example process for determining calibration parameters.
Figure 3:
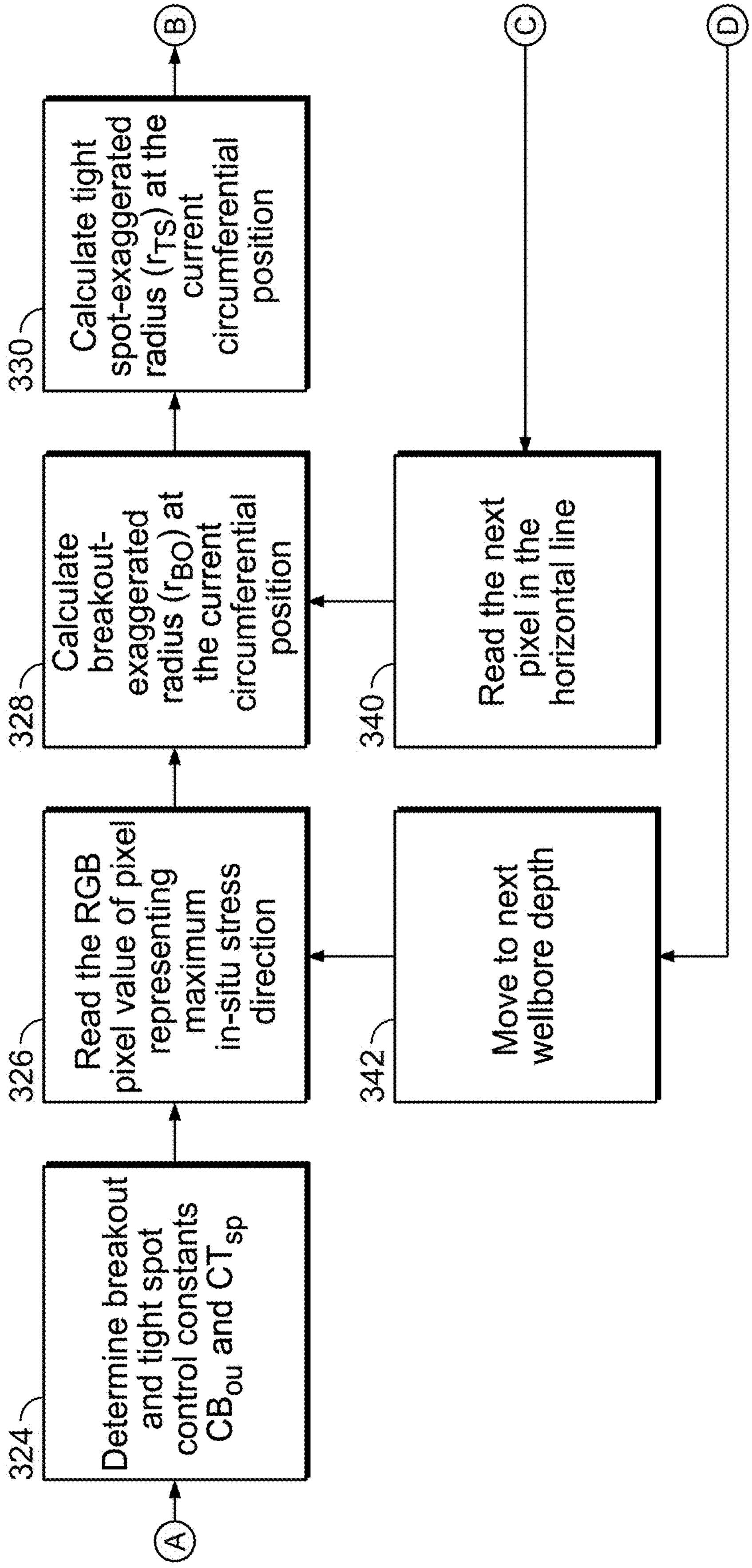
Figure 3:
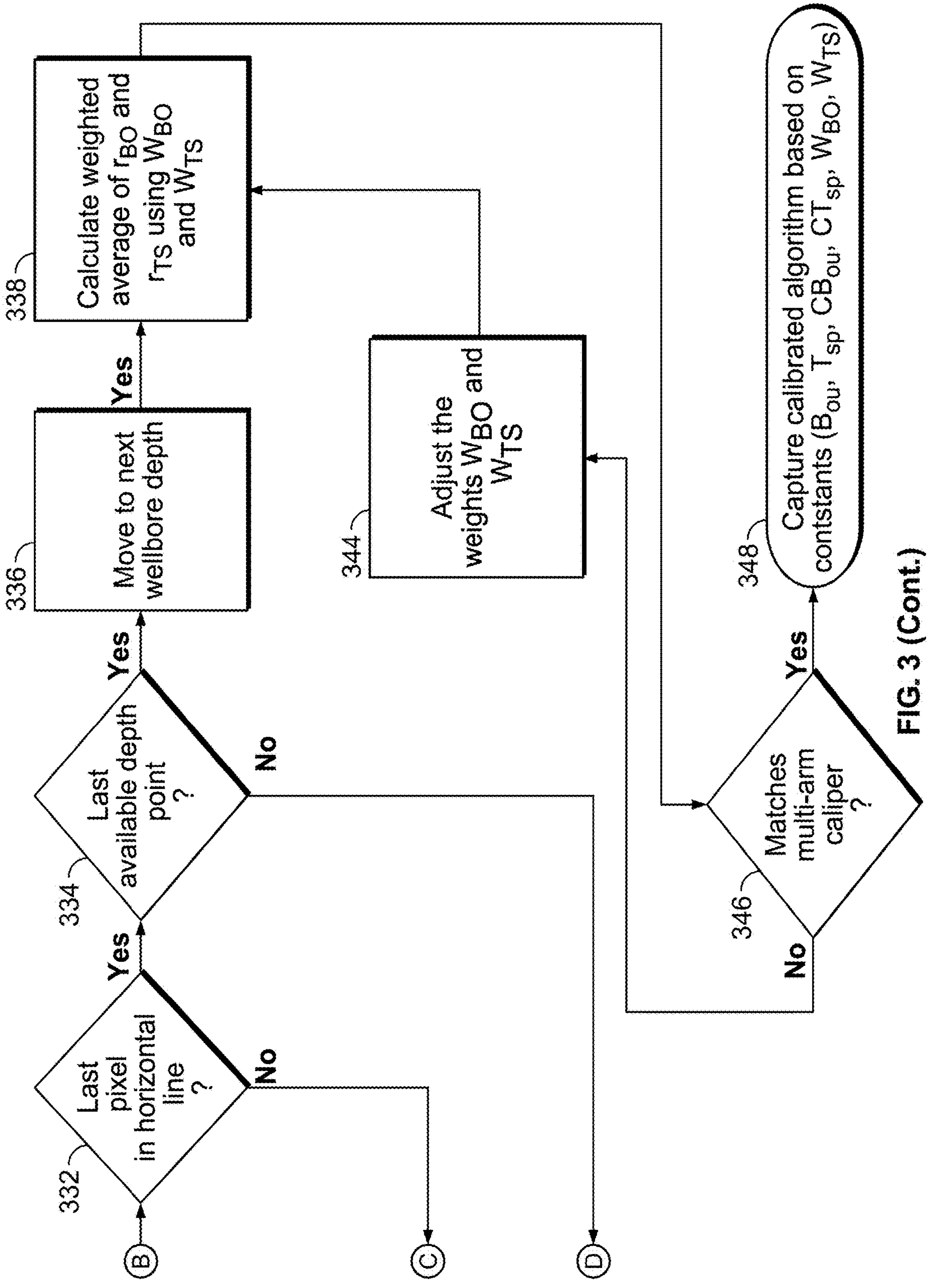

FIG. 3 shows a block diagram illustrating an example process 300 for determining the calibration parameters for converting an ultrasonic image log into a volume estimation of the wellbore, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

The process 300 illustrates the determination of calibration parameters for ultrasonic well log image data for the precise evaluation of a wellbore volume. Ultrasonic well logs are a type of downhole survey used to measure the properties of the subsurface formations around a wellbore. The data processing system can interpret the ultrasonic well log images (302) in a similar manner to other types of image data by extracting (304) RGB values for each pixel where RGB refers to "red, green, and blue" channels of a color image. In this case, the RGB values offer a convenient framework for visualizing the scale of the properties being measured by the well log. The data processing system can collect the ultrasonic well log images at a plurality of depths, in which the system can assign (306) a wellbore depth to each horizontal line of pixels in the ultrasonic well log image. The result is a two-dimensional image where the x-axis can represent the circumferential distribution of the measured property, the y-axis can represent the depth of the wellbore, and color or brightness of each pixel represents the value of the property at the specific depth and angle. For example, the color or brightness value of the pixel can represent the radius of the wellbore wall, the density, the porosity, or any other property that can be measured by a downhole measurement technique like an ultrasonic well log image acquisition system.

The process 300 relies on some data other than the ultrasonic image log 302 itself to perform the calibration process. These data are the bit size 308, multi-arm mechanical caliper log measurements 314, and a definition of the direction of the maximum in-situ stress 316. The data processing system can use the bit size to determine (310) a reference uniform radius and to assign (312) physical dimension to an individual pixel size. The data processing system can estimate the physical size that each pixel represents with the following formula, $$\theta_c = \frac{2\pi}{\text{number of pixels}}$$

where $\theta_C$ represents the circumferential angle per pixel and number of pixels refers to the number of pixels in each horizontal line a specific wellbore depth, and $$s_c = r_{bit}\theta_c.$$

where $s_c$ is the arc length spanned by each pixel and $r_{bit}$ is the nominal radius of the wellbore defined by the radius of the drill bit. The data processing system can describe the bit size in terms of its diameter $d_{bit}$. The data processing system can express the radius of the bit as $r_{bit}=d_{bit}/2$.

The data processing system correlates the maximum in-situ stress direction with the direction of wellbore enlargements or breakouts as observed in the image. The system determines (320) the maximum in-situ stress direction to find the wellbore breakout azimuth (316). The direction of maximum in-situ stress refers to the direction within the subsurface where the stress is greatest. In-situ stresses include vertical stress, which is primarily due to the weight of the overlying rock, and horizontal stresses, which can be influenced by tectonic forces, geological structures, or differences in rock properties. Wellbore breakouts can occur during or after drilling when the concentration of stresses around the wellbore exceed the strength of the rock, causing pieces of the wellbore wall to break off and enlarge the wellbore diameter. Drilling a wellbore creates a disruption in the stress field in the local formation, resulting in stress concentration around the wellbore. The stress is redistributed and becomes anisotropic, with the highest concentration at points around the wellbore aligned with the minimum and maximum horizontal stress directions. In some cases, the maximum breakout in a wellbore is aligned with the direction of maximum in-situ stress of the underlying formation.

Figure 5:
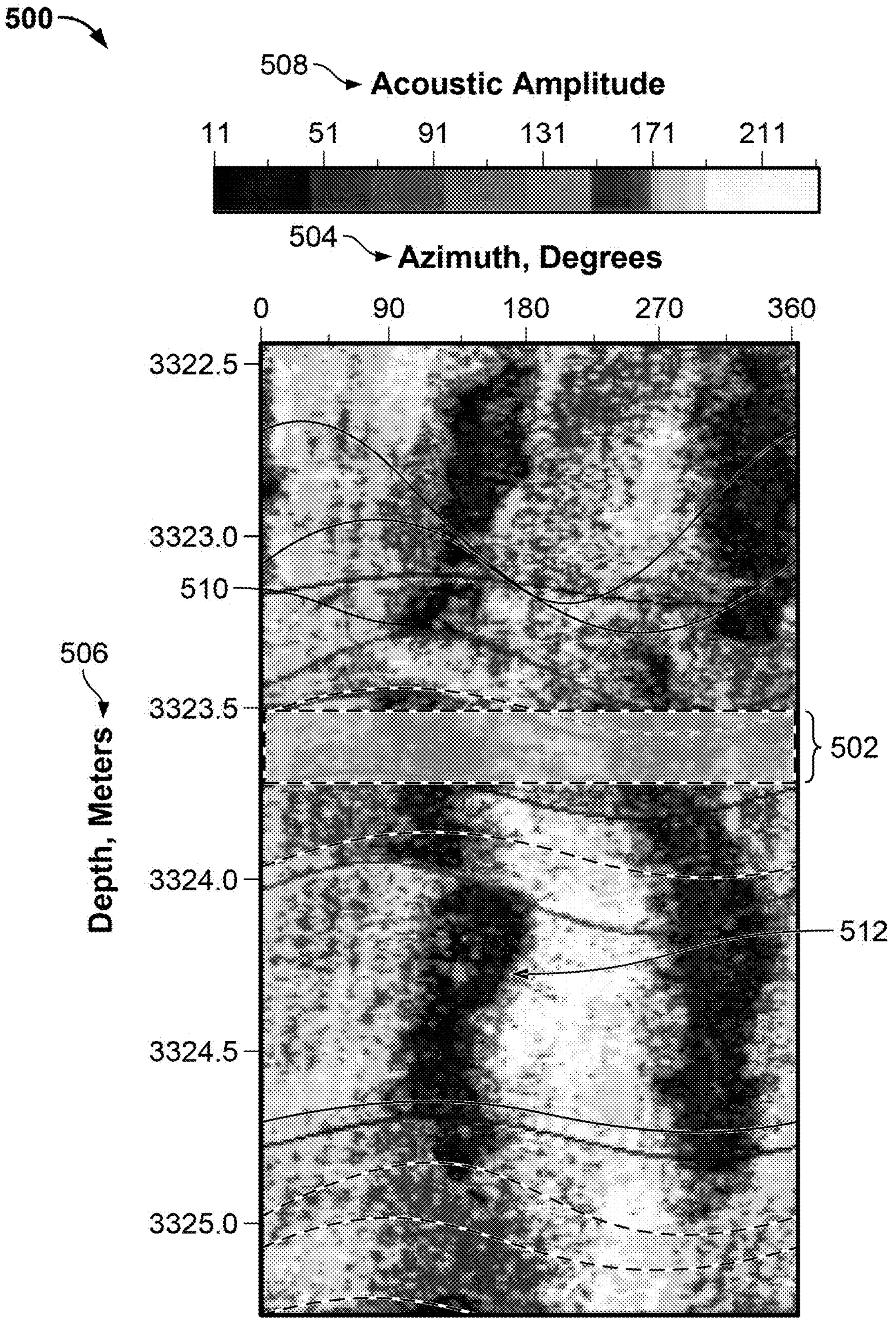
FIG. 5 illustrates an example ultrasonic well log image.

The data processing system can use the multi-arm mechanical caliper log measurements to ascertain the extend of the radial depth of a darkly colored breakout zone such as the breakout zones shown in FIG. 5. The mechanical caliper log measurements are also used to ensure correct interpretation of tight spots, which are characterized by bright spots on the log and a radius that is smaller than that of the bit size.

The data processing system determines (318) $B_{ou}$ and $T_{sp}$, which are the breakout and the tight spot calibration constants respectively. The mechanical caliper log measurements estimate the maximum radius and the minimum radius of the wellbore along the entire depth of the wellbore and over a plurality of circumferential angles.

The data processing system can define (322) the maximum red color pixel value and the minimum blue color pixel value. The data processing system can use the maximum red color pixel value and minimum blue color pixel value to determine (324) the breakout and tight spot control constants ($CB_{ou}$ and $CT_{sp}$) as follows:

$$CB_{ou} = \frac{\text{Bit size}}{\text{Maximum red color pixel value}}$$

$$CT_{sp} = \frac{\text{Bit size}}{\text{Minimum red color pixel value}}$$

where $CB_{ou}$ and $CT_{sp}$ are correlated to the identification of the most darkly colored region in the image (which represents the deepest breakout) and the most brightly colored region (which represents the tightest spot in the hole). The data processing system reads (326) the RGB pixel value of the pixel representing the maximum in-situ stress direction determined in relation to step 316, and along with the calibration constants ($B_{ou}$ and $T_{sp}$), the system calculates (328) a breakout-exaggerated radii ($r_{BO}$) and to calculate 330 a tight spot exaggerated-radii ($r_{TS}$) as follows:

$$r_{BO} = B_{ou}(\text{Bit size} - (\text{Red}_i \times CB_{ou})) + \text{Bit size}$$

$$r_{TS} = T_{sp}(\text{Bit size} - (\text{Blue}_i \times CT_{sp})) + \text{Bit size}$$

where $\text{Red}_i$ and $\text{Blue}_i$ are the red and blue values for all pixels in a single horizontal line which defines the wellbore full circumference. The data processing system can determine the breakout-exaggerated radii and tight spot-exaggerated radii for each pixel, e.g., for each circumferential angle.

The data processing system checks (332) if the pixel is the last pixel in the horizontal line. If it is not, the system reads (340) the next pixel in the horizontal line and the exaggerated radii are calculated for the next pixel. If the next pixel is the last pixel in the horizontal line, the system checks (334) if the horizontal line is the last available depth. If the horizontal line is not the last available depth, the system moves (342) to the next wellbore depth and continues the process by reading (326) the RGB pixel value of the pixel representing maximum in-situ stress. If this horizontal line is the last available depth, the system moves (336) to the next wellbore depth and the pixels in the subsequent horizontal line are read and processed. If the pixel belongs to the final horizontal line, the system continues to the final step of calculating (338) a weighted average between $r_{BO}$ and $r_{TS}$ as follows:

$$\text{Radius} = W_{BO} \times r_{BO} + W_{TS} \times r_{TS}$$

where $W_{BO}$ and $W_{TS}$ are the average weights, which the data processing system can determine through a trial-and-error process that involves matching (346) the weighted average with the actual multi-arm mechanical caliper log measurements as shown in FIG. 5 and adjusting (344) the weights $W_{BO}$ and $W_{TS}$ to minimize the error between the mechanical caliper measurements and the calibrated value calculated using the equation above. The weights $W_{BO}$ and $W_{TS}$ that yield the minimum error between the evaluated radii and the radii determined by the multi-arm mechanical caliper measurements capture (348) the calibrated algorithm constants $B_{ou}$, $T_{sp}$, $CB_{ou}$, $CT_{sp}$, $W_{BO}$, and $W_{TS}$.

The data processing system can apply the process 300 to each unique image logging tool one or more times to ensure that the images produced from the tool are correctly interpreted. The data processing system can repeat the same process for a calibrated tool when it is run in a new environment.

Figure 4:
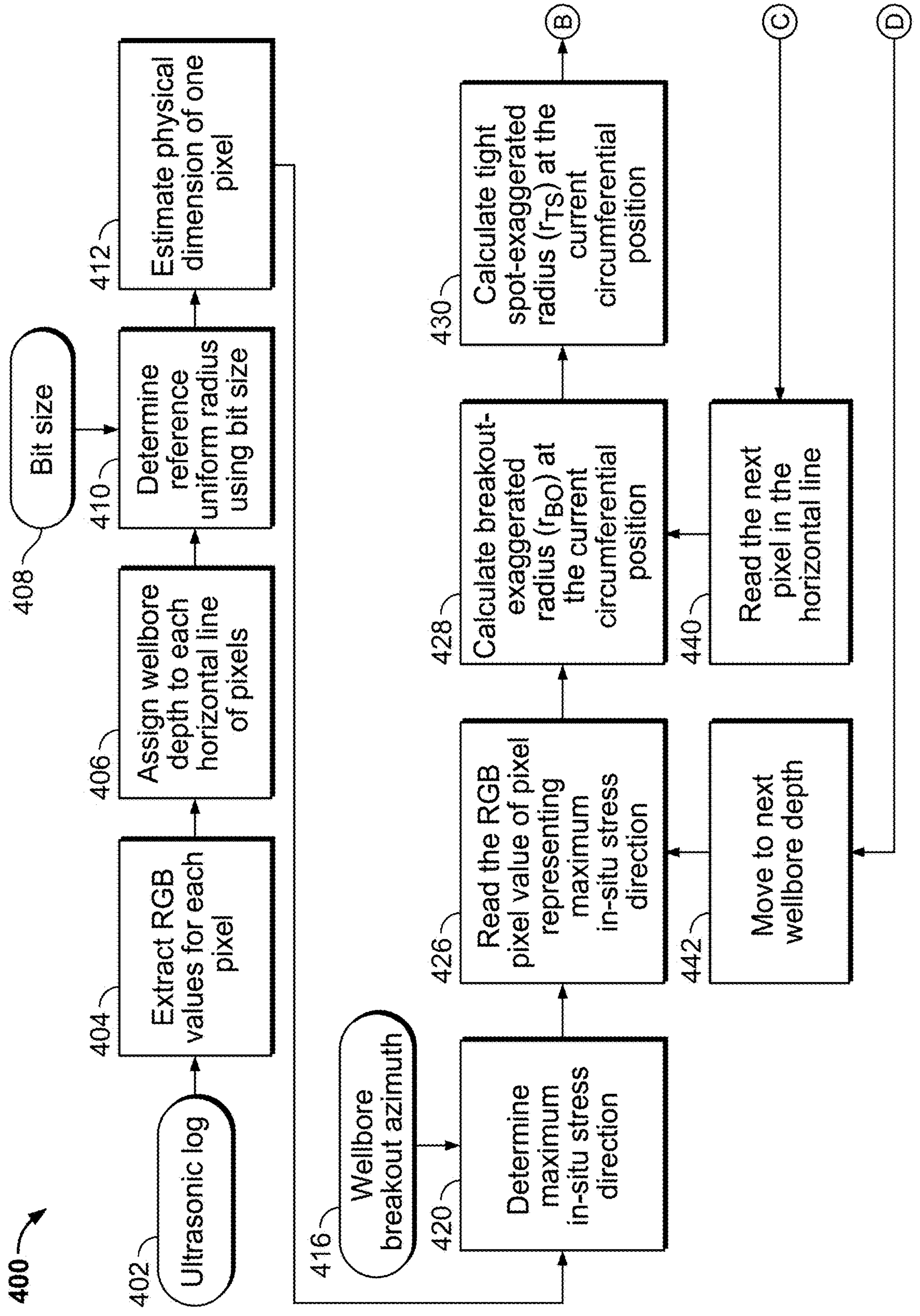
FIG. 4 shows a block diagram illustrating an example process for evaluating the volume of a wellbore.
Figure 4:
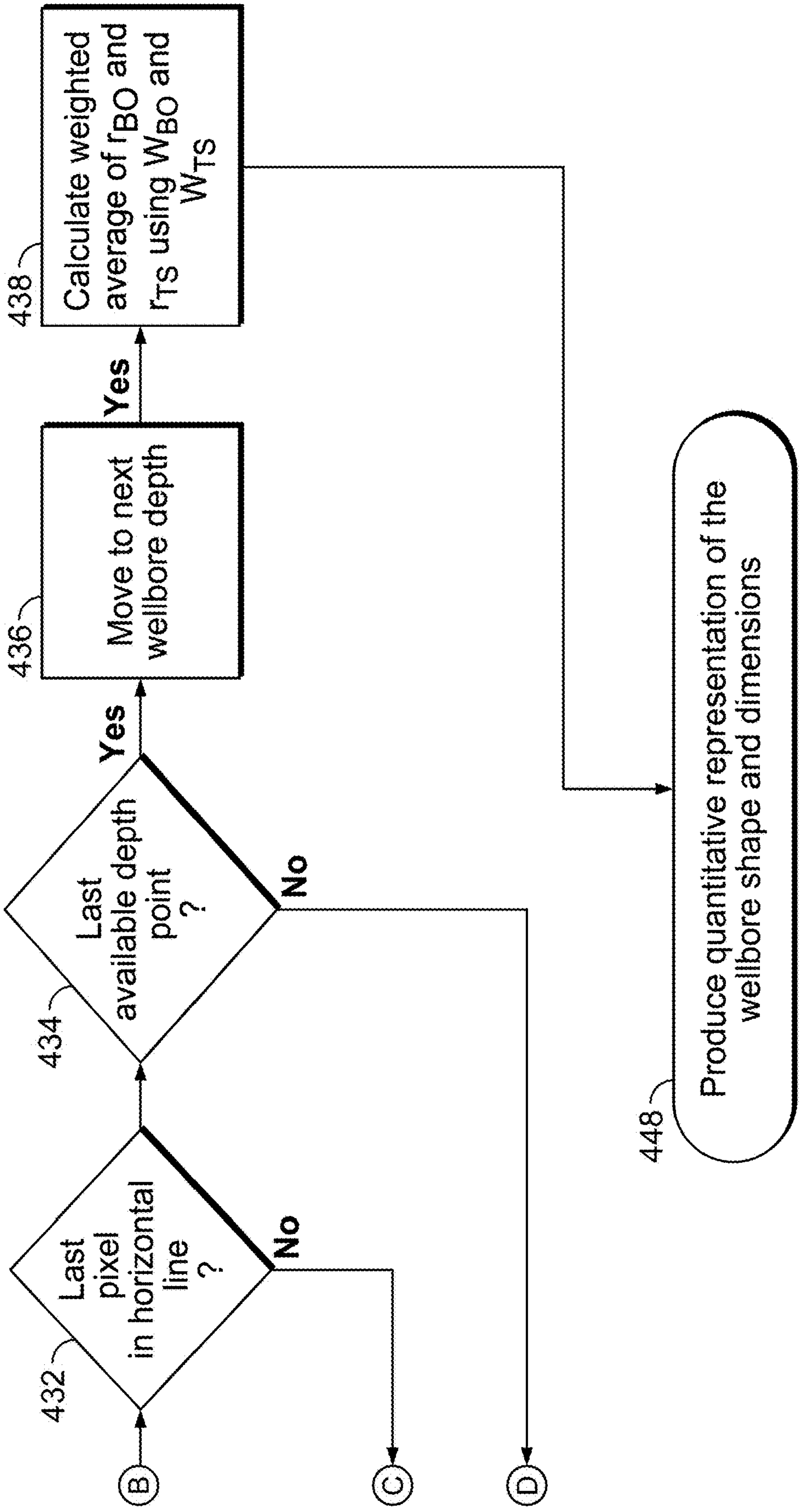

Once the calibration process 300 is applied to a certain imaging tool, the image produced by the imaging tool in new wellbore sections or new wellbores can be interpreted to produce a full 360° radial measurements by utilizing the method depicted in reference to FIG. 4.

FIG. 4 shows a block diagram illustrating an example process 400 for determining the quantitative representation of the wellbore shape using the calibration parameters generated from the process described in relation to FIG. 3, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

The process 400 includes the acquisition of an ultrasonic well log 402, similar to the well log used to determine the calibration parameters as described in relation to FIG. 3. The system can process the well log image to extract (404) the RGB values for each pixel in the image. The system can assign (406) a wellbore depth to each horizontal line of pixels corresponding to the depth of the measurement device when the data was acquired. The system can determine the calibration parameters that correspond to the specific environment which includes the bit size 408 to determine the reference uniform radius 410 and to estimate (412) the physical dimension of one pixel as described in relation to FIG. 3. In addition, the system can determine (420) the maximum in-situ stress to determine the wellbore breakout azimuth angle 416, as described in relation to FIG. 3. Notably, the process 400 does not require the multi-arm mechanical caliper measurement because the caliper measurements are only needed during the calibration step to determine the calibration parameters. Further processes like the process 400 can use the calibration parameters found in the process as described in relation to FIG. 3 to determine radial measurements instead of relying on multi-arm mechanical caliper measurements with every new ultrasonic well log.

Like the process 300 described in relation to FIG. 3, the system reads (426) the RGB value of the pixel representing the maximum in-situ stress direction to assign the likely angle of maximum breakout. The system calculates (428) the breakout-exaggerated radius ($r_{BO}$) and calculates (430) the tight spot-exaggerated radius ($r_{TS}$) at the current circumferential position, similar to the process described in relation to FIG. 3.

The data processing system calculates the exaggerated radii at the plurality of circumferential positions at the plurality of wellbore depths. After calculating the exaggerated radii for each pixel, the system checks (432) if the pixel is the last pixel in the horizontal line. If it is not the last pixel in the horizontal line, the next pixel is read in the horizontal line and the system calculates the corresponding exaggerated radii. If the pixel is the last pixel in the horizontal line, the system checks (434) if the horizontal line belongs to the last wellbore depth point. If the horizontal line does not belong to the last wellbore depth point, the system continues to process the sequential horizontal line and repeats the process described above. If the horizontal line does belong to the last wellbore depth point, the system moves (436) to the final wellbore depth and calculates (438) the weighted average of $r_{BO}$ and $r_{TS}$ using the constants $W_{BO}$ and $W_{TS}$ derived by the system implementing the process 300 in relation to FIG. 3. The system produces (448) a quantitative representation of the wellbore shape and dimensions by calculating a weighted average of $r_{BO}$ and $r_{TS}$ at each circumferential angle using the weighting constants $W_{BO}$ and $W_{TS}$.

FIG. 5 shows an example of an ultrasonic image log 500 from an 8.375 inch (the diameter of the bit, which is the nominal radius of the wellbore) wellbore showing stress-induced wellbore enlargements. The highlighted zone 502 is the interval used for providing an example of image log interpretation. The horizontal axis of FIG. 5 represents the circumferential angle 504, the vertical axis represents the depth of the wellbore 506, and the color scale represents the acoustic amplitude 508 of the ultrasonic signal. The data represent an approximately 2.5-meter section of the wellbore. The bright spots 510 represent tight spots, or areas where the wall of the wellbore is closer to the center of the wellbore. The dark spots 512 represent breakout sections, or areas where the wall of the wellbore is further from the center of the wellbore. The data analysis system can interpret the acoustic amplitude of the reflected wave from a portion of the wall closer to the sensor to be greater than the acoustic amplitude of the reflected wave from a portion of the wall further from the sensor.

Figure 6:
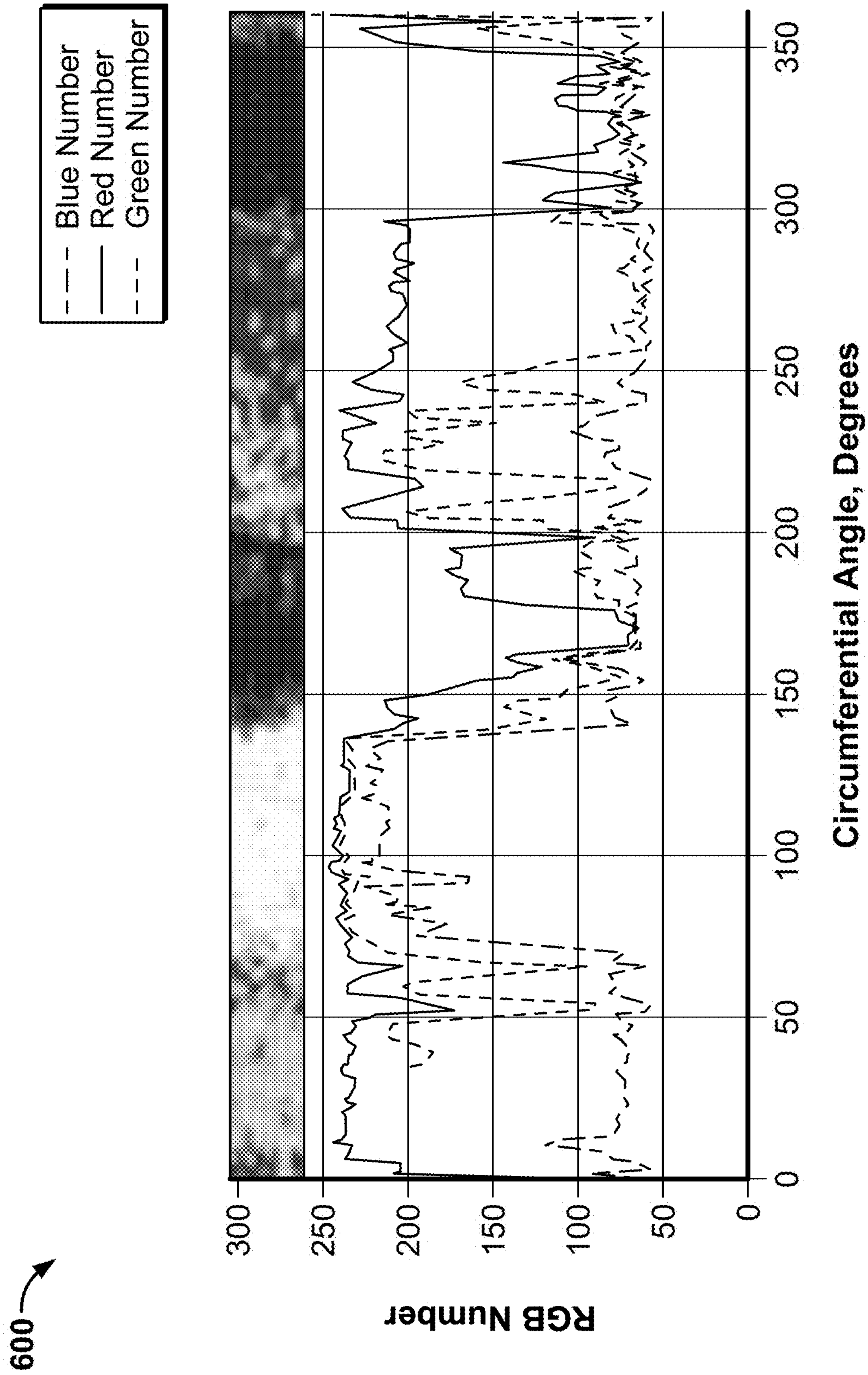
FIG. 6 illustrates a graph showing an example interpretation of an ultrasonic image log.

FIG. 6 shows an example of a graph 600 of an ultrasonic image log in relation to the highlighted section depicted in FIG. 5. The data depicted in FIG. 6 illustrate a correlation between the RGB number (pixel value) and the angular position of enlargements (breakouts) and tight spots. The correlation between the pixel value and the angular position of enlargements and tight spots can be used along with calibrating values from a mechanical multi-arm caliper log to calculate the radial measurements of the wellbore at all directions. As mentioned previously, the number of radial measurements produced is dependent on the number of pixels available in the image log, e.g., the image resolution. In this example, the image log has resolution of 221 pixels per the 360 degrees around the wellbore, which equates to around one radius measurement for each 1.63° degrees around the circumference of the wellbore. This example contrasts with traditional multi-arm mechanical calipers which typically measure the radius of a wellbore at fewer than 20 angular positions.

Figure 7A:
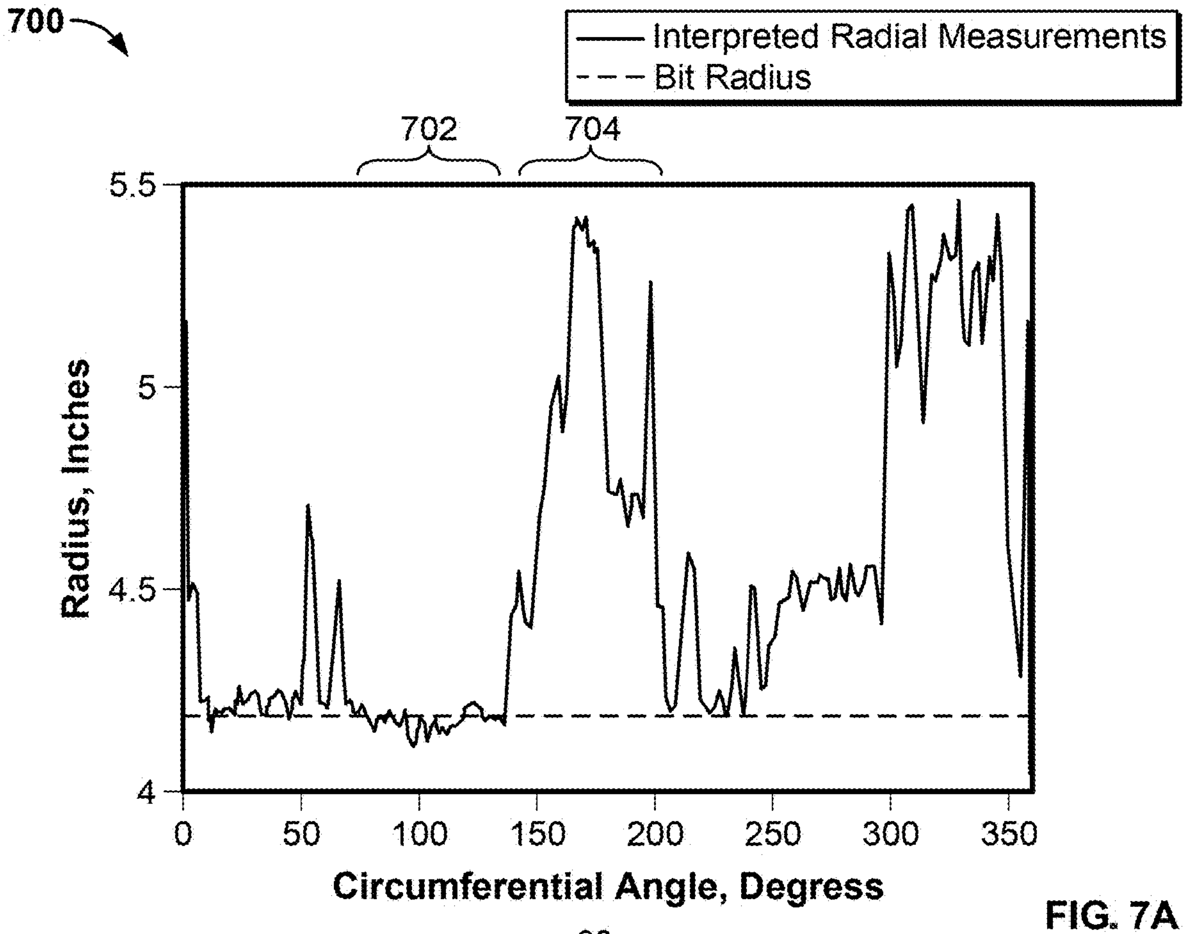
FIG. 7A illustrates a graph showing an example interpretation of an ultrasonic image log in cartesian coordinates.

FIG. 7A shows an example of a graph 700 of the ultrasonic image log in relation to the highlighted section depicted in FIG. 5. The data show the results of the image log interpretations that are calibrated with mechanical caliper log readings in cartesian coordinates. When comparing the ultrasonic image log interval in FIG. 5 to the interpreted radial measurements in FIG. 7A, it can be clearly seen that the dark regions in the image that signify the presence of wellbore enlargements are also reflected as radial measurements that are higher than the bit radius (depicted as a solid red line in FIG. 7A). For example, the interpreted radii depicted in FIG. 7A between 75° and 140° (702) indicate a tight spot, or a region where the radius of the wellbore is less than or equal to the nominal radius defined by the bit size. The corresponding region in relation to FIG. 5 and FIG. 6 are bright, indicating the measured acoustic amplitude is high in relation to other circumferential angles and that the reflected surface is located closer to the sensor. Similarly, the interpreted radii depicted in FIG. 7A between 150° and 200° (704) indicate a wellbore breakout or enlargement, or a region where the radius of the wellbore is greater than the nominal radius defined by the bit size. The corresponding region in relation to FIG. 5 and FIG. 6 are dark, indicating the measured acoustic amplitude is low in relation to other circumferential angles and that the reflected surface is located further from the sensor.

Figure 7B:
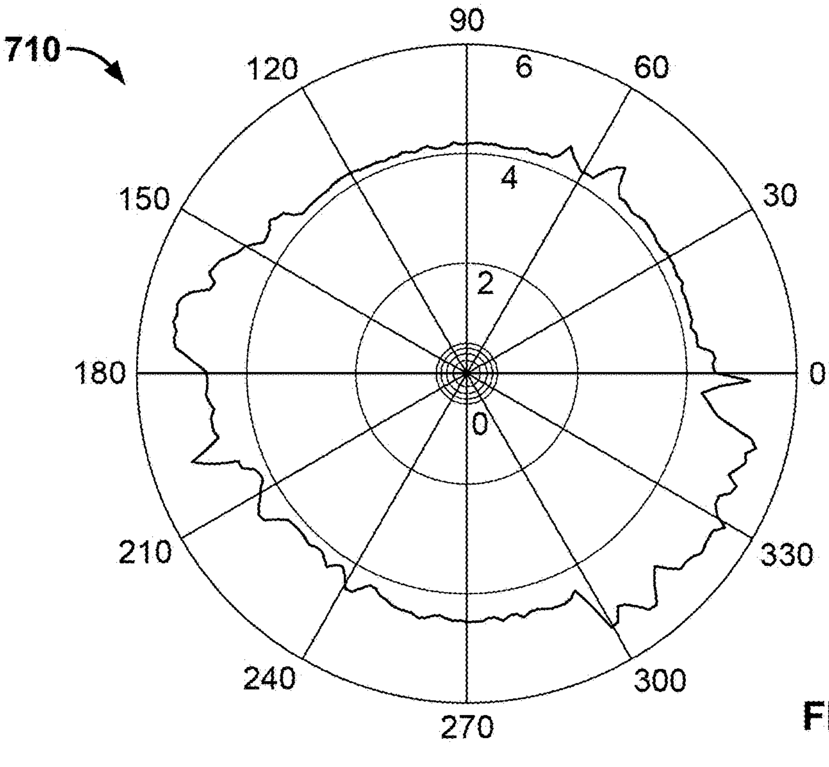
FIG. 7B illustrates a graph showing an example interpretation of an ultrasonic image log in polar coordinates.

FIG. 7B shows an example of a plot 710 of the ultrasonic image log in relation to the highlighted section depicted in FIG. 5. The data show the results of the image log interpretations that are calibrated with mechanical caliper log readings in polar coordinates, to match the real-world shape of the image log. Similar to the data displayed in cartesian coordinates in relation to FIG. 7A, the tight spot regions (between 75° and 140°) and the breakout regions (between 150° and 200°) are visible in relation to the nominal wellbore radius defined by the bit size (approximately 4.1875 inches).

Figure 8:
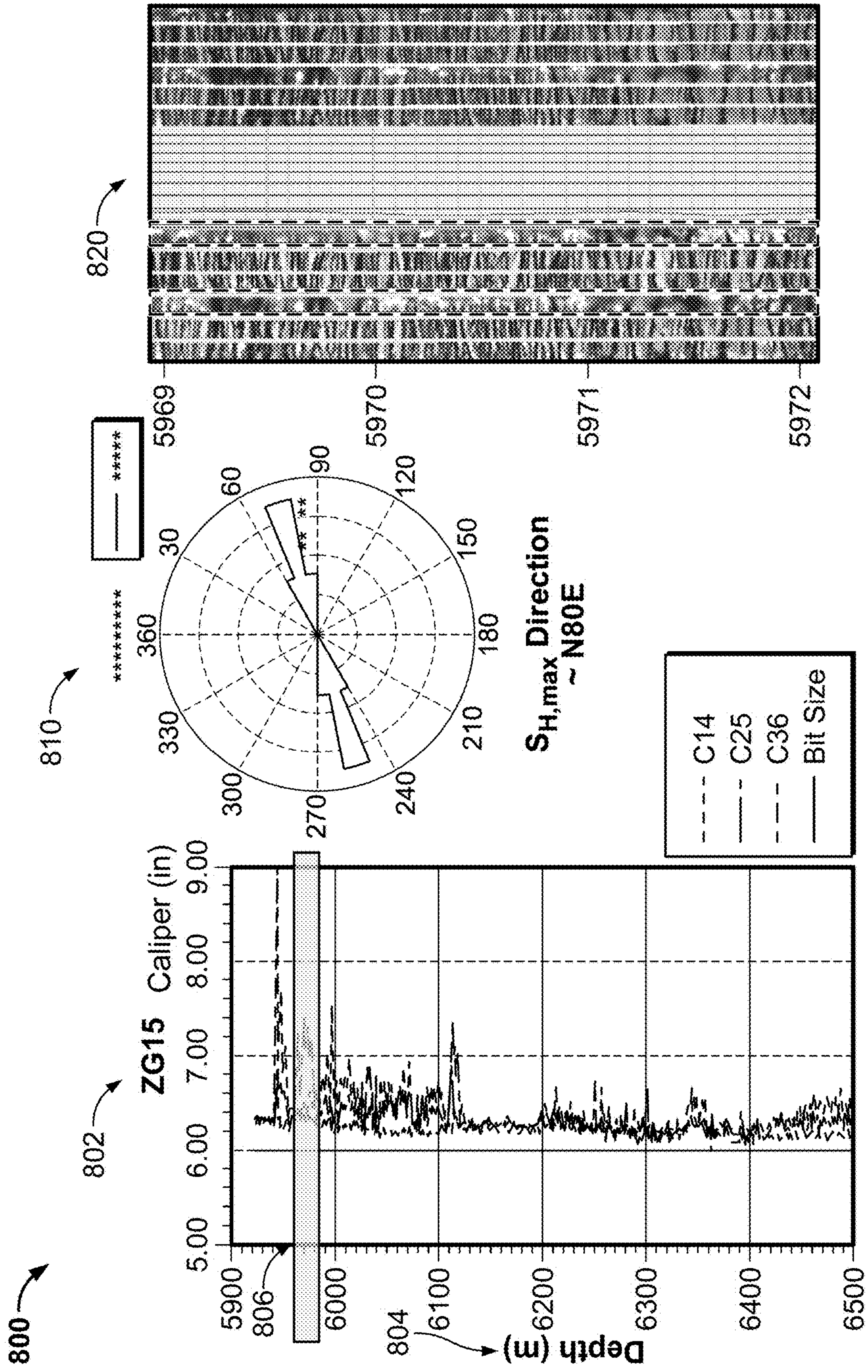
FIG. 8 illustrates example resistivity well log data.

FIG. 8 shows an example of a resistivity image log along with mechanical caliper log readings 800. Similar to the case of ultrasonic image logs, as illustrated in relation to FIGS. 3-7B, resistivity well logs can provide data that reveals the radial extent of the walls of a wellbore. Resistivity well logs measure the resistivity of the rock and fluids in the formation around a wellbore and are based on the principle that different geological materials have different abilities to conduct electric current. For example, rocks saturated with saline water will conduct electricity well, whereas hydrocarbon-filled rocks or dry rocks will have higher resistivity. Resistivity logging tools typically consist of a series of electrodes (pads) that are lowered into a wellbore. By applying electric current between a source electrode and the surrounding formations, and measuring the potential difference with a receiver electrode, the tools can calculate the resistivity of the surrounding materials.

A difference between ultrasonic image well logs and resistivity image well logs is that resistivity images normally contain gaps due to the space between the electrical pads of the resistivity image logging tool. In addition, resistivity-based image logs differ from ultrasonic image logs in the way a breakout (or wellbore enlargement) can be identified. In ultrasonic well logs, changes in color (or brightness) are sufficient to indicate which regions are closer than other regions to the sensor; however, in resistivity images, changes in color along can be misleading as they can signify laminations, faults, and natural and induced fractures along with breakouts. Resistivity logs are efficient indicators of "physical features" within the wellbore, but they are poor indicators of the spatial (specifically, radial) extension of these physical features. In other words, there are multiple factors within a wellbore that can change the value of a resistivity image other than the distance of the wellbore wall from the center of the wellbore.

A distinguishing feature of breakouts in comparison with other physical features, e.g., laminations and faults, in relation to resistivity images is the decreased resolution of the image at that breakout orientation. The decreased resolution at breakouts is due to the electrical pad of the resistivity logging tool being further away from the wellbore wall when the resistivity image measurements are taken. When the electrical pads are extended to the wellbore wall, there is a separation between them. If the distance that the pads are extended increase, the distance between the two pads increases as well since they are extended at an angle relative to each other. The deviation in resolution can be exploited in this image interpretation process to identify the orientation of breakouts. In other words, breakouts (wellbore enlargements) can be identified by regions of decreased image resolution of the resistivity image well logs. However, the extent of the breakout (or tight spot) cannot be quantified without additional information. Similar to the case of ultrasonic image well logs, multi-arm mechanical caliper readings can be used to correlate the radial extent at ever location along the axis of the wellbore.

The RGB pixel values can be feature scaled using the following formula to produce the correct radii, $$\text{Scaled } RGB = CAL_{min} + \frac{RGB_{adj} - RGB_{min}}{(RGB_{max} - RGB_{min})}(CAL_{max} - CAL_{min})$$

where $CAL_{min}$ and $CAL_{max}$ are the minimum and maximum radii provided by the multi-arm mechanical caliper readings respectively. $RGB_{adj}$ is the adjusted RGB reading for filtering out potential noise and white gaps in the image. The distance between electrodes creates discontinuities in the measurements as a function of circumferential angle. In addition, noise sources in resistivity image well logs may include tool eccentricity where the measurement tool is not centered within the well bore, variable wellbore conditions including irregular shapes and unexpected fluids, and formation heterogeneity due to variations in rock properties. Standard interpolation and filtering techniques can be used to correct for known sources of error that are specific to the conditions of each wellbore.

Graph 800 shows an example of a multi-arm mechanical caliper well log reading, like the readings used to calibrate the evaluation of well log using both ultrasonic and resistivity well log image data. The horizontal axis 802 depicts the caliper extension from the tool to the point of contact with the wall of the wellbore. The vertical axis depicts the depth of the wellbore 804 from which the mechanical caliper measurement is made. A breakout or wellbore enlargement can be identified with an extension of the mechanical caliper arm. For example, the highlighted region 806 indicates a wellbore enlargement. The mechanical caliper measurement is made at a fixed circumferential angle indicated by the diagram in the middle of FIG. 8.

Graph 820 shows an example of a resistivity image well log that corresponds to the highlighted horizontal red box 806 of the mechanical caliper well log 800. The horizontal axis depicts the circumferential angle around the center of the wellbore. The vertical axis depicts the depth of the wellbore that corresponds to the highlighted horizontal red box on the left. As depicted in 820, the highlighted vertical red boxes display decreased image resolution in comparison to other vertical sections of the image. The red box corresponds to the breakout section highlighted in the multi-arm mechanical caliper data. The resolution of the resistivity image can be interpreted as an indication of the wall of the wellbore being further away from the center of the wellbore in comparison to other points.

Figure 9:
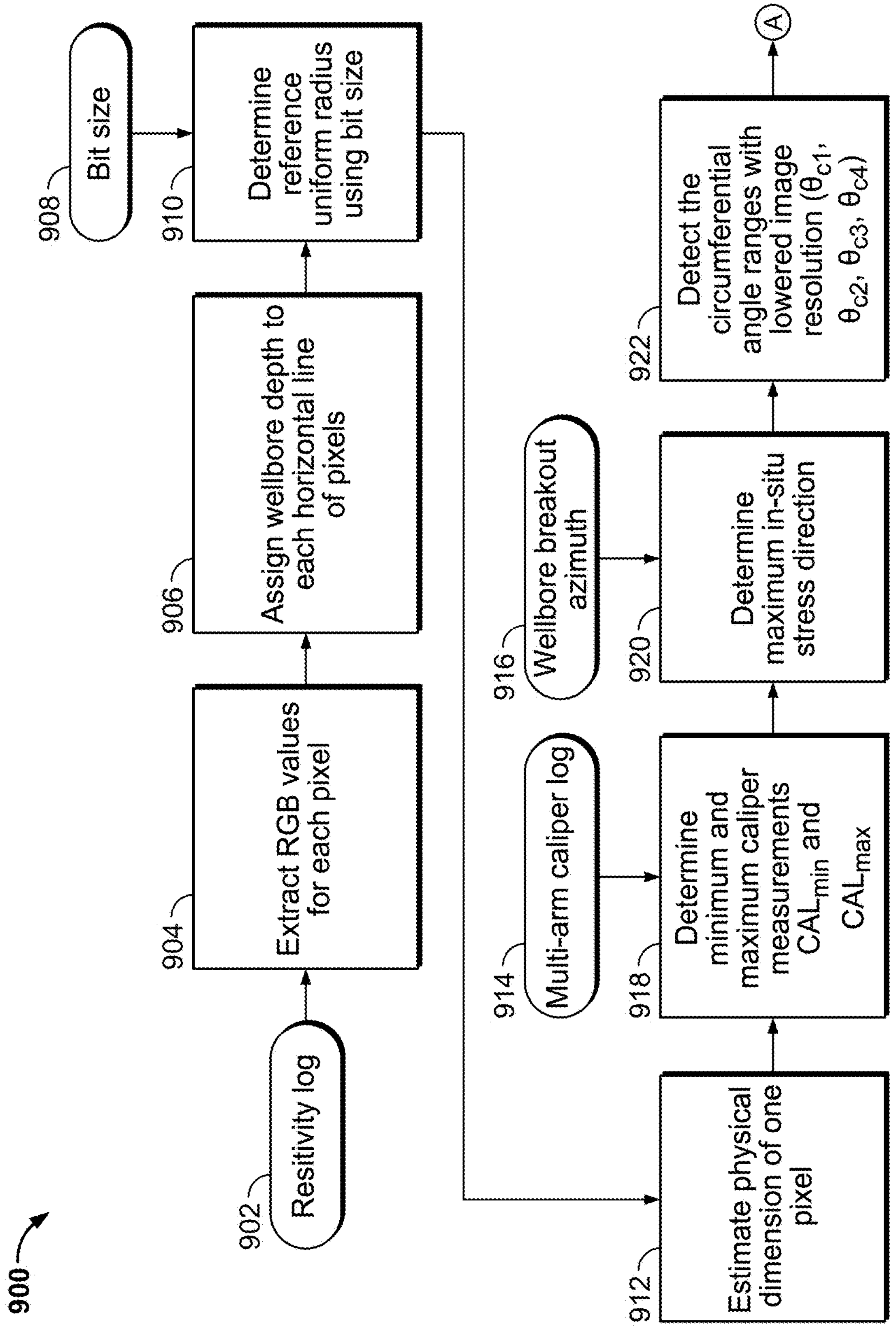
FIG. 9 shows a block diagram illustrating an example process for evaluating the volume of a wellbore.
Figure 9:
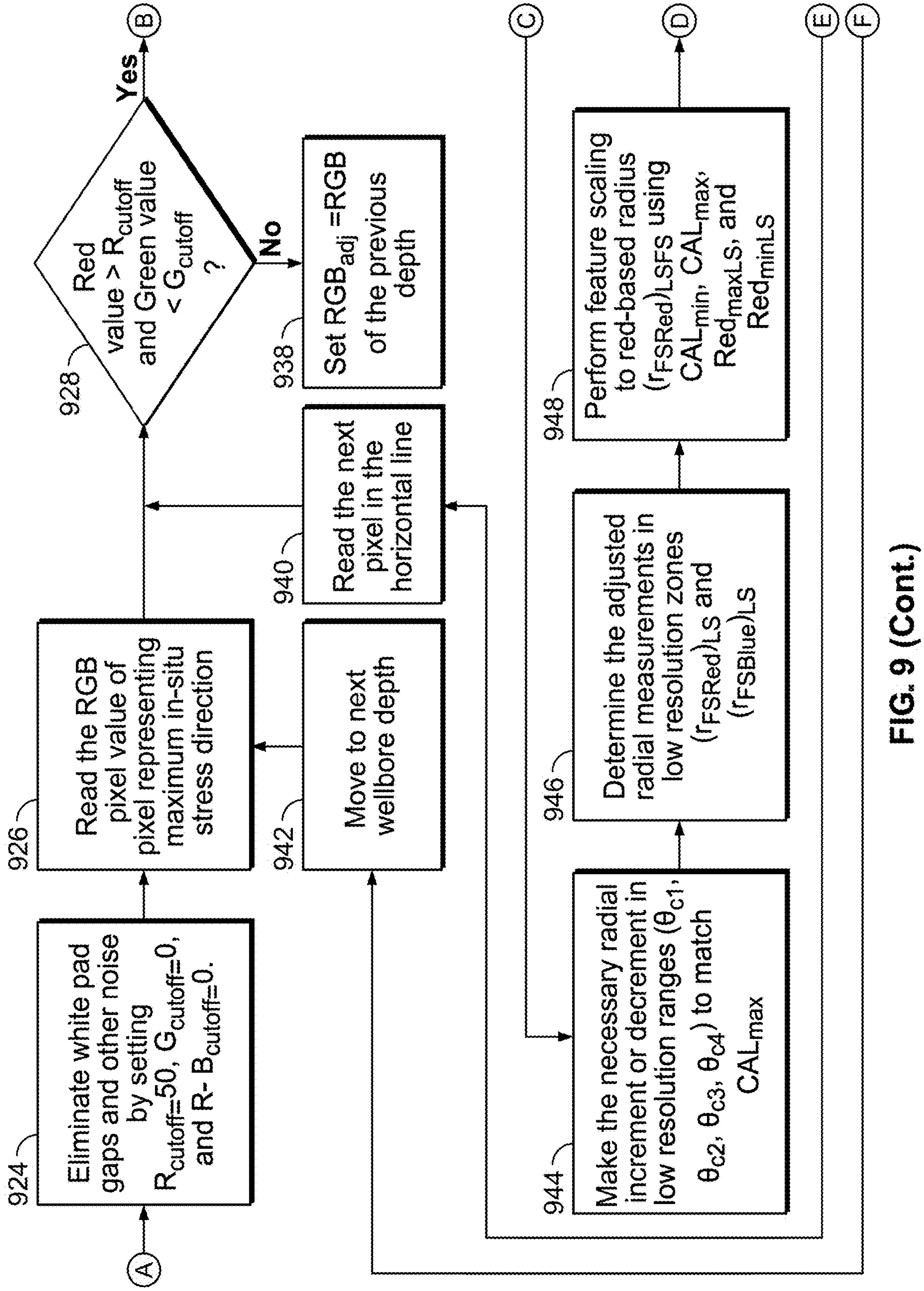
Figure 9:
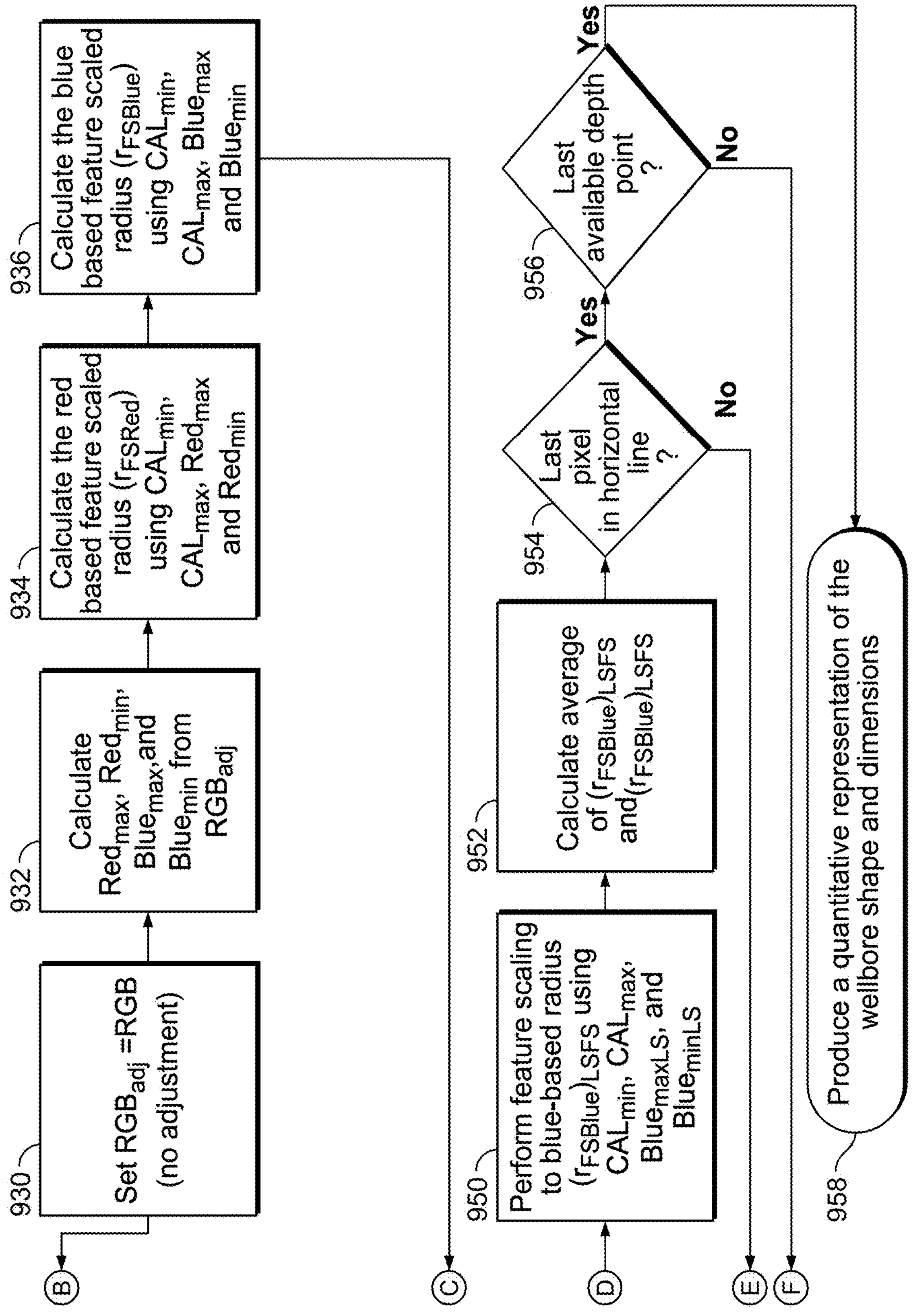

FIG. 9 shows a block diagram illustrating an example process 900 for interpreting resistivity-based image to determine a volume estimation of the wellbore, according to some implementations of the present disclosure. For clarity of presentation, the description that follows generally describes method 900 in the context of the other figures in this specification. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

The process 900 illustrates the determination of the shape and dimensions of a wellbore using resistivity well log image. Resistivity well logs are a type of downhole survey used to measure the properties of the subsurface formations around a wellbore. The data processing system can interpret resistivity well log images (902) in a similar manner to other types of image data by extracting (904) RGB values for each pixel where RGB refers to "red, green, and blue" channels of a color image. In this case, the RGB values offer a convenient framework for visualizing the scale of the properties being measured by the well log. The data processing system can collect the resistivity well log images at a plurality of depths, in which the system assigns (906) a wellbore depth to each horizontal line of pixels in the resistivity well log image. The result is a two-dimensional image where the x-axis can represent the circumferential distribution of the measured property, the y-axis can represent the depth of the wellbore, and color or brightness of each pixel represents the value of the property at the specific depth and angle. For example, the color or brightness value of the pixel can represent the radius of the wellbore wall, the resistivity, or any other property that can be measured by a downhole measurement technique like a resistivity well log image acquisition system.

Similar to the process related to ultrasonic image well logs described in relation to FIGS. 3-7B, the process 900 relies on some data other than the image log itself to perform the interpretation process. These data are the bit size 908 which is used to determine (910) the reference uniform radius and to estimate (912) the physical dimension of one pixel, as described in relation to the process described in relation to FIG. 3. In addition, the data processing system can use the multi-arm mechanical caliper log measurements 914 to determine (918) the minimum and maximum caliper measurements $CAL_{min}$ and $CAL_{max}$. The data processing system also requires the direction of the wellbore breakout azimuth 916 to determine (920) the maximum in-situ stress direction, as described in relation to the process described in relation to FIG. 3.

The system can identify regions of low-resolution like the regions depicted by the highlighted vertical red boxes on the right side of FIG. 8. The system can detect (922) the circumferential angle ranges with low resolution defined as ($\theta_{c1}$, $\theta_{c2}$, $\theta_{c3}$, $\theta_{c4}$) where 1 and 2 define the starting and final angle of the first zone while 3 and 4 define the range for the second zone.

The system can adjust the RGB values to produce $RGB_{adj}$ for the purpose of filtering out noise and white gaps in the image, as described in relation to FIG. 8. The adjustment process relies of an upper cutoff value of 0 for each pixel green color value ($G_{cutoff}$), a lower value of 50 for each pixel red color value ($R_{cutoff}$), a lower value of 0 for the subtraction of blue from red color values ($R-B_{cutoff}$). The rule of thumb eliminates (924) white pad gaps and other noise by setting $R_{cutoff}=50$, $G_{cutoff}=0$, and $R-B_{cutoff}=0$.

The system can read (926) the RGB pixel value of the pixel representing the maximum in-situ stress direction. The system evaluates (928) if the red value of each pixel is greater than the red cutoff value and if the green value is less than the green cutoff value. In other words, the system evaluates an expression Red value>$R_{cutoff}$ and Green value<$G_{cutoff}$. If the expression is false, the system sets $RGB_{adj}$=RGB of the previous depth. The filter corrects for cases where the values indicate an unexpected deviation due to the white pad gaps or other noise and the RGB values are interpolated using the values from the previous depth. If the expression is true, the system sets (930) $RGB_{adj}$=RGB (no adjustment), and no adjustment is made. The measured values are within the expected range and accepted.

The system can calculate (932) $Red_{max}$, $Red_{min}$, $Blue_{max}$, and $Blue_{min}$ from $RGB_{adj}$, where the adjusted RGB values are corrected for white pad gaps and other noise and include a range of red and blue pixel values which can be analyzed to determine the minimum and maximum values.

The system can calculate (934) the red based feature scaled radius ($r_{FSRed}$) using $CAL_{min}$, $CAL_{max}$, $Red_{max}$, and $Red_{min}$. Similarly, the system can calculate (936) the blue based feature scaled radius ($r_{FSBlue}$) using $CAL_{min}$, $CAL_{max}$, $Blue_{max}$, and $Blue_{min}$.

The system can make (944) the necessary radial increment or decrement in low resolution ranges ($\theta_{c1}$, $\theta_{c2}$, $\theta_{c3}$, $\theta_{c4}$) to match $CAL_{max}$. The system can determine (946) the adjusted measurements in low resolution zones $(r_{FSRed})_{LS}$ and $(r_{FSBlue})_{LS}$. The system can perform (948) feature scaling to red-based radius $(r_{FSRed})_{LSFS}$ using $CAL_{min}$, $CAL_{max}$, $Red_{maxLS}$ and $Red_{minLS}$. In addition, the system can perform (950) feature scaling to blue-based radius $(r_{FSBlue})_{LSES}$ using $CAL_{min}$, $CAL_{max}$, $Blue_{maxLS}$, and $Blue_{minLS}$. The system can calculate (952) the average of $(r_{FSBlue})_{LSFS}$ and $(r_{FSRed})_{LSFS}$.

For each pixel in the image, the adjusted radii can be calculated. After each calculation, the system checks (954) if the pixel is the last pixel in the horizontal line. If the pixel is not the last pixel in the horizontal line, the system reads (940) the next pixel in the horizontal line and performs the filtering logic as described in relation to step 928. If the pixel is the last pixel in the horizontal line, the system checks (956) if the pixel is a member of the horizontal line at the last available depth point. If the horizontal line is not the last available depth point, the system moves (942) to the next wellbore depth and reads the RGB pixel value of the pixel representing the maximum in-situ stress direction as described in relation to step 926 and repeats the steps from this stage. If the pixel represents the last available depth point, the system has processed every pixel in the image and can produce (958) a quantitative representation of the wellbore shape and dimensions.

Figure 10A:
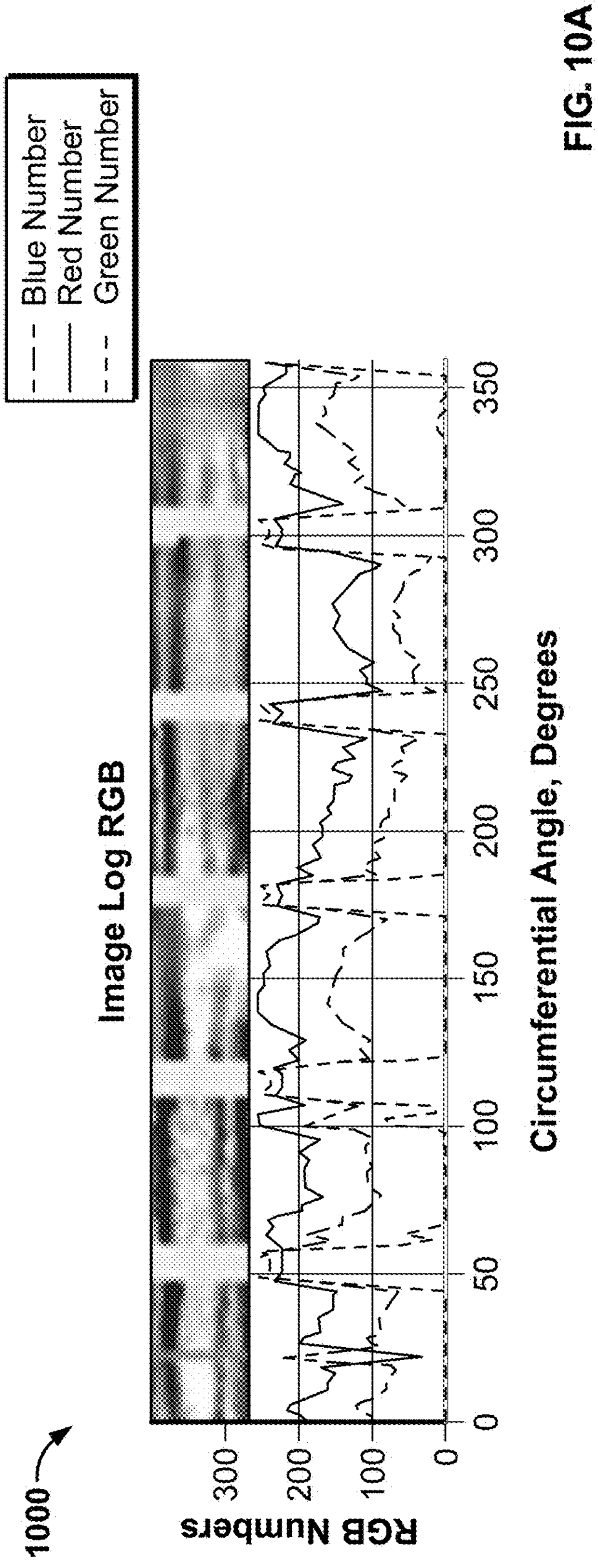
FIG. 10A illustrates an example of the original image values of a resistivity well log.
Figure 10B:
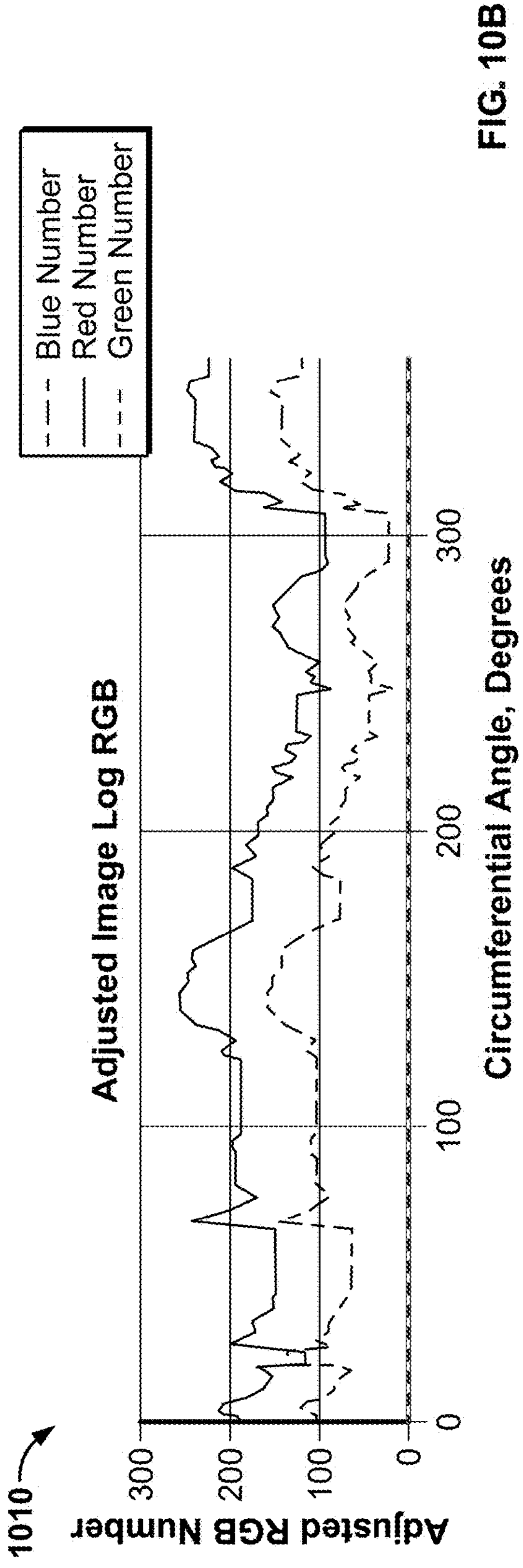
FIG. 10B illustrates an example of the adjusted image values of a resistivity well log.

FIGS. 10A-B shows the original RGB number of the resistivity image log from FIG. 8 and the adjusted RGB values to account for the image gaps and other image noise. FIG. 10A shows a plot 1000 of the RGB numbers from the resistivity image log showing a clear correlation between the location of the image gaps (due to physical gaps between electrodes), the low-resolution areas, and the trends in the RGB numbers. FIG. 10B shows a graph 1010 of the adjusted RGB numbers of the resistivity image log to remove noise.

Figure 11A:
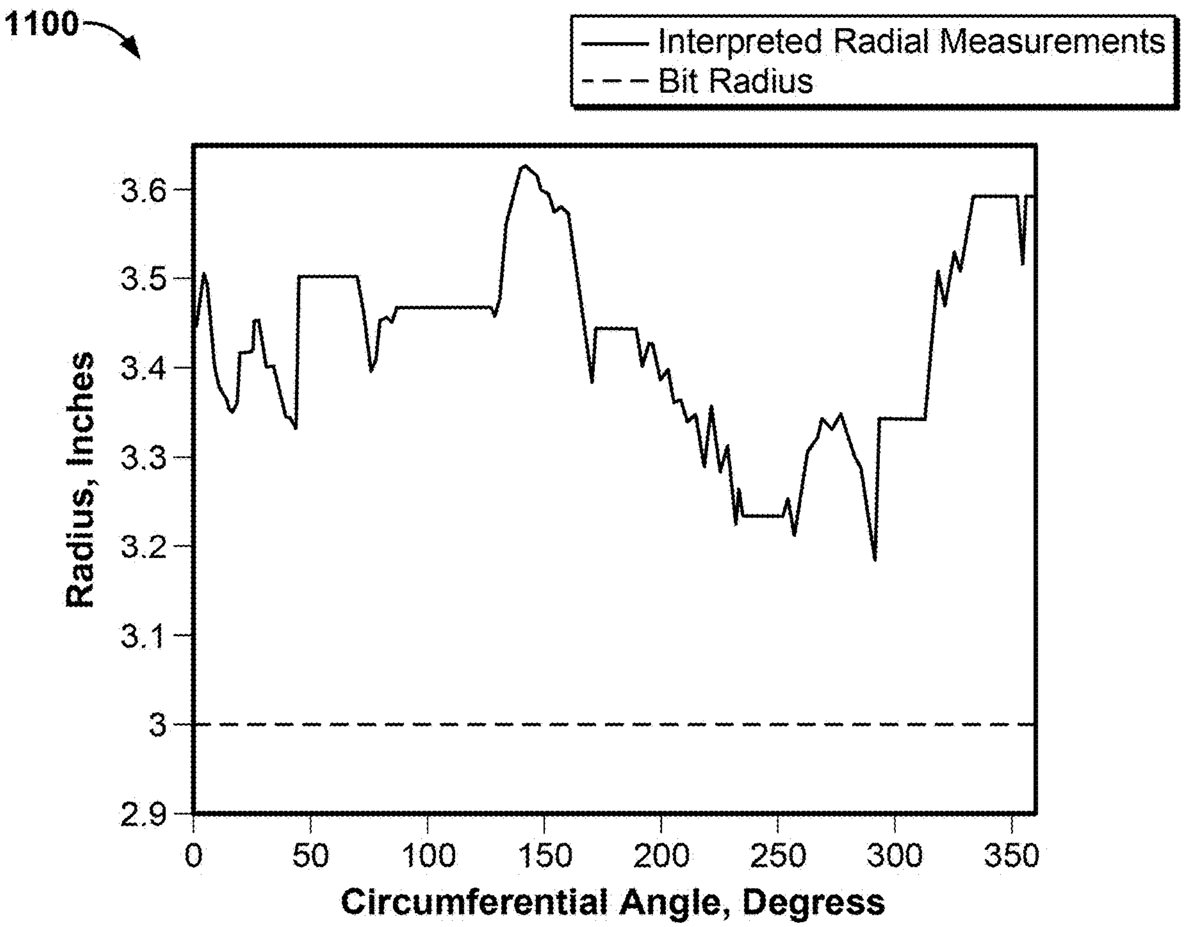
FIG. 11A illustrates an example interpretation of a resistivity well log in cartesian coordinates.
Figure 11B:
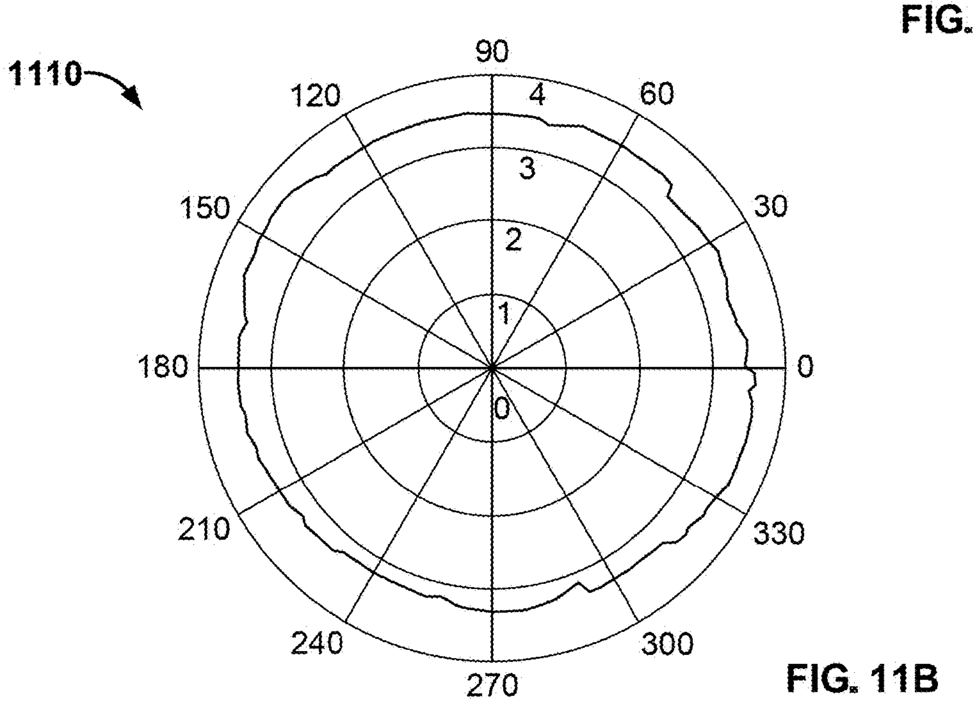
FIG. 11B illustrates an example interpretation of a resistivity well log in polar coordinates.

FIGS. 11A-B show the results of the image log interpretations that are calibrated with mechanical caliper log readings in both cartesian (e.g., graph 1100) and polar coordinates (e.g., graph 1110). When comparing the resistivity image log interval in FIG. 8 to the interpreted radial measurements in FIG. 11A, the low-resolution regions in the image that signify the presence of wellbore enlargements are also reflected as radial measurements that are higher than the bit radius. Also, when examining the mechanical caliper readings in the interval highlighted in relation to 800, there is an agreement that the wellbore is fully enlarged in all directions.

Graph 1100 illustrated in FIG. 11A shows the results of the resistivity image log interpretation showing radial measurements in cartesian coordinates. Graph 1110 illustrated in FIG. 11B shows the results of the resistivity image log interpretation showing radial measurements in polar coordinates to reflect the actual shape of the wellbore cross-section.

Figure 12:
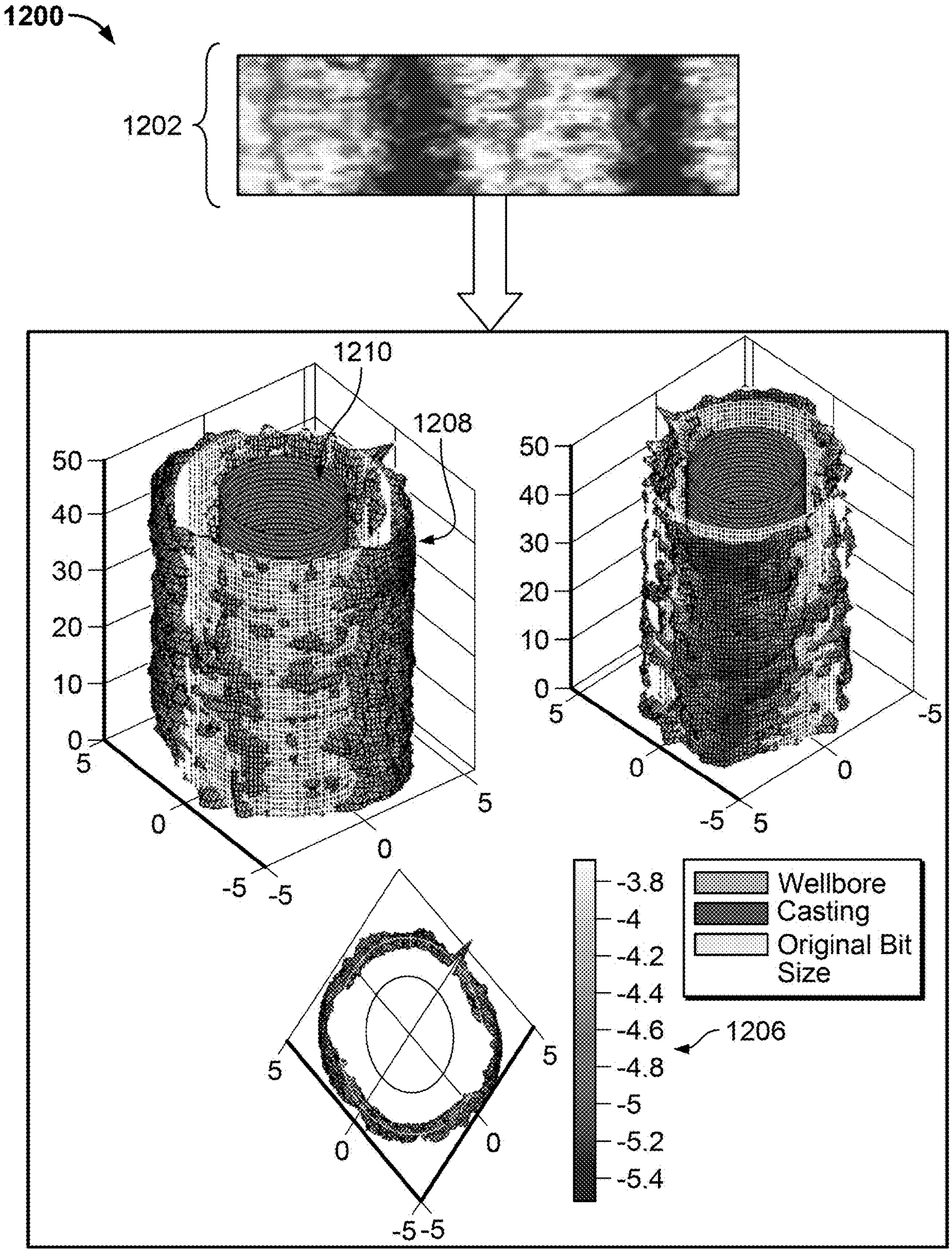
FIG. 12 illustrates examples of three-dimensional representations of the wellbore.

FIG. 12 represents a depiction of the interpretation of the sonic image log 1202 into a three-dimensional representation 1204 of a well section. The 3D model shows the actual shape of the wellbore wall rock 1208, the actual bit size, and the casing size 1204. The color gradient 1206 represents the variations of wellbore radii around its circumference.

For both sonic and resistivity-based image logs, the interpretations made from each row of pixels can be different from the following row. Therefore, stitching each row interpretation with the following one is necessary to depict the wellbore shape variations along the wellbore axis or the wellbore measured depth. The data processing system combines the two-dimensional interpretations that are produced from the processes described in relation to the two previous sections of this specification. An example of the result of this process is shown in FIG. 12. The FIG. 1204 provide a depiction of the interpretation of a sonic image log into a three-dimensional representation of a well section. The 3D model shows the actual shape of the wellbore wall rock, the actual bit size, and the casing size. The 3D representation illustrates regions of enlargements (bit over-gauge) and tight spots (bit under-gauge) in the wellbore.

Figure 13:
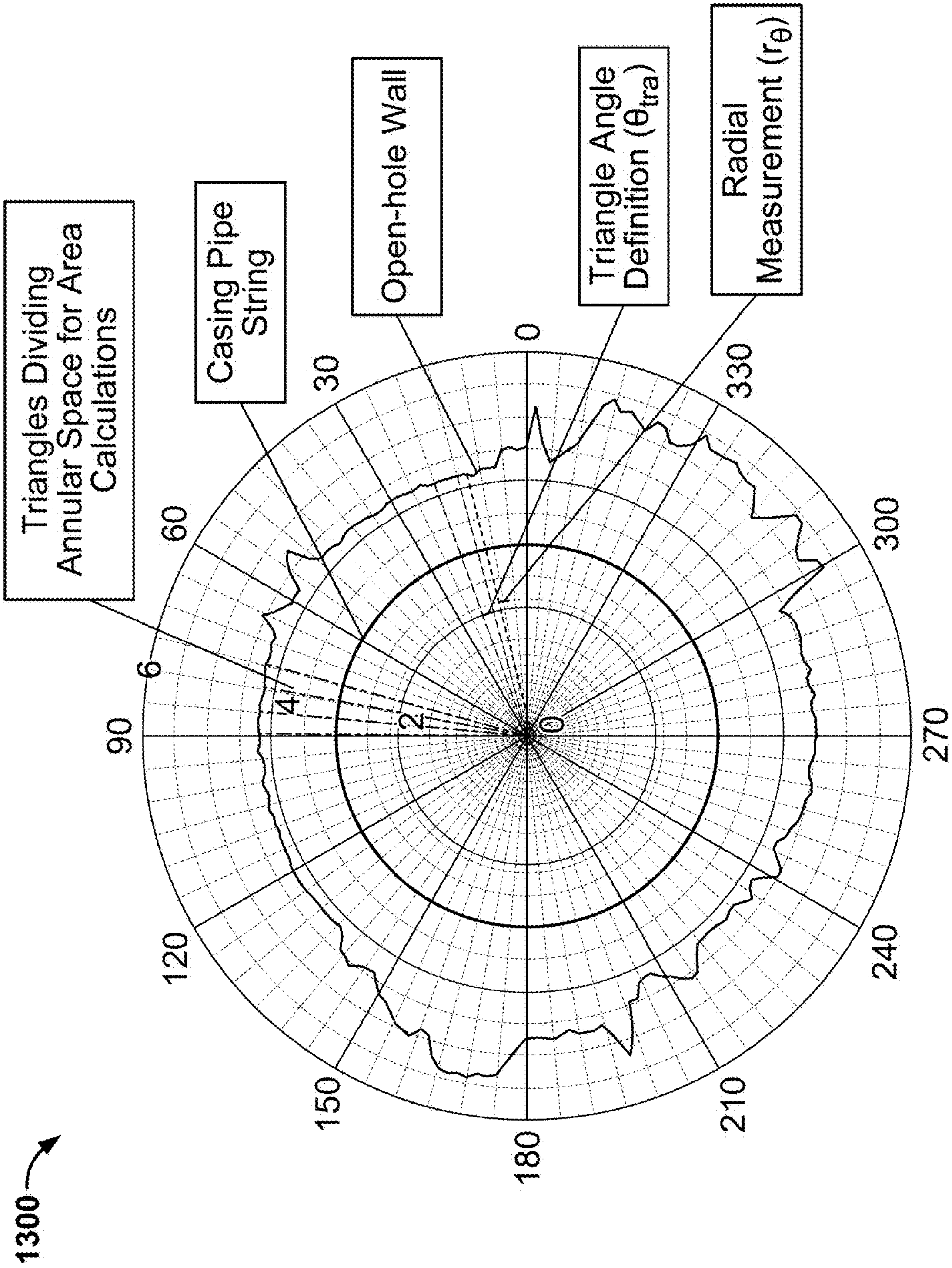
FIG. 13 illustrates an example of a representation of a wellbore in polar coordinates.

FIG. 13 shows the results of the resistivity image log interpretation showing radial measurements in polar coordinates to reflect the actual shape of the wellbore cross-section.

Once the 3D shape of the wellbore is defined, the system can calculate the volume enclosed by the annular space between the casing and the open hole using the formula below. The process of calculating the enclosed volume is also described in relation to FIG. 12.

$$V_{csg-OH} = \left\{ \sum_{j=1}^{m} \left( \left[ \sum_{i=1}^{n} \frac{1}{2} r_{\theta-i} \sin(\theta_{tra-i}) \right] \times H_{Pixel} \right)_j \right\} - \pi r_{csg}^2 H_{Pixel}$$

$V_{csg-OH}$=The volume enclosed by the annular space between the casing and the openhole $r_{\theta-i}$=The radial measurement at a specific circumferential angle (i) as interpreted by the image log algorithm $r_{csg}$=The uniform outside radius of the casing tubular $\theta_{tra-i}$=Circumferential angle (i) that defines each triangle in a 2D cross-section of the wellbore $H_{pixel}$=The physical length of the image log pixels along the axis of the wellbore n=Total number triangles in a single 2D cross-section of the wellbore i=Index variable referring to each triangle in a single 2D cross-section of the wellbore m=Total number of pixel rows in the image log that represent all 2D cross-sections of the wellbore j=Index variable referring to each pixel row in the image log that represent each 2D cross-section of the wellbore.

Figure 14:
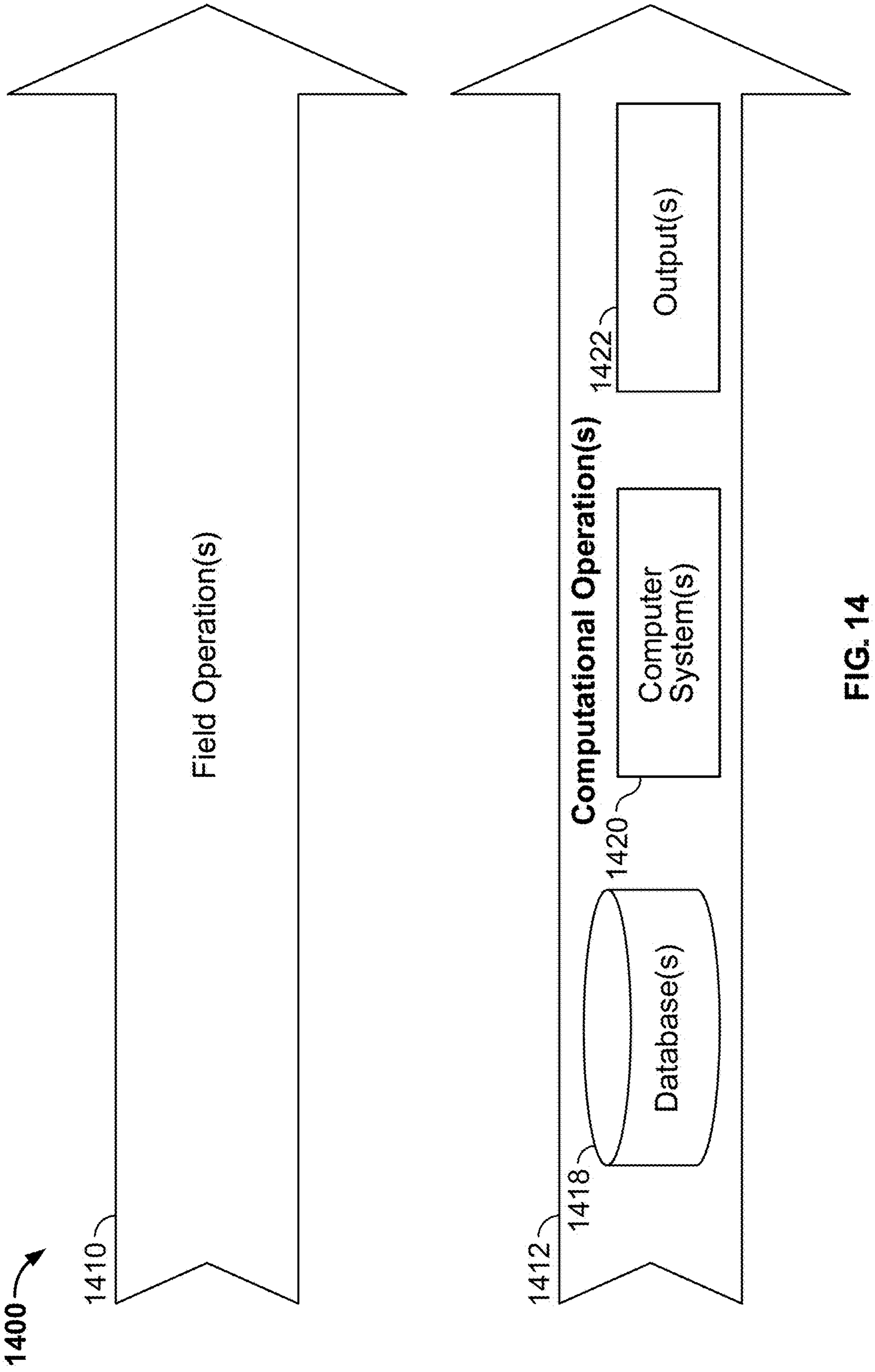
FIG. 14 illustrates example hydrocarbon production operations.

FIG. 14 illustrates hydrocarbon production operations 1400 that include both one or more field operations 1410 and one or more computational operations 1412, which exchange information and control exploration to produce hydrocarbons. In some implementations, outputs of techniques of the present disclosure (e.g., the method 300) can be performed before, during, or in combination with the hydrocarbon production operations 1400, specifically, for example, either as field operations 1410 or computational operations 1412, or both. For example, the processes 300, 400 collect data during field operations, processes the data in computational operations, and can determine locations to perform additional field operations.

Examples of field operations 1410 include forming/drilling a wellbore, hydraulic fracturing, producing through the wellbore, injecting fluids (such as water) through the wellbore, to name a few. In some implementations, methods of the present disclosure can trigger or control the field operations 1410. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 1410 and responsively triggering the field operations 1410 including, for example, generating plans and signals that provide feedback to and control physical components of the field operations 1410. Alternatively, or in addition, the field operations 1410 can trigger the methods of the present disclosure. For example, implementing physical components (including, for example, hardware, such as sensors) deployed in the field operations 1410 can generate plans and signals that can be provided as input or feedback (or both) to the methods of the present disclosure.

Examples of computational operations 1412 include one or more computer systems 1420 that include one or more processors and computer-readable media (e.g., non-transitory computer-readable media) operatively coupled to the one or more processors to execute computer operations to perform the methods of the present disclosure. The computational operations 1412 can be implemented using one or more databases 1418, which store data received from the field operations 1410 and/or generated internally within the computational operations 1412 (e.g., by implementing the methods of the present disclosure) or both. For example, the one or more computer systems 1420 process inputs from the field operations 1410 to assess conditions in the physical world, the outputs of which are stored in the databases 1418. For example, seismic sensors of the field operations 1410 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 1412 where they are stored in the databases 1418 and analyzed by the one or more computer systems 1420.

In some implementations, one or more outputs 1422 generated by the one or more computer systems 1420 can be provided as feedback/input to the field operations 1410 (either as direct input or stored in the databases 1418). The field operations 1410 can use the feedback/input to control physical components used to perform the field operations 1410 in the real world.

For example, the computational operations 1412 can process the seismic data to generate three-dimensional (3D) maps of the subsurface formation. The computational operations 1412 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 1412 to process new information about the formation and control the drilling to adjust to the observed conditions in real-time.

The one or more computer systems 1420 can update the 3D maps of the subsurface formation as information from one exploration well is received and the computational operations 1412 can adjust the location of the next exploration well based on the updated 3D maps. Similarly, the data received from production operations can be used by the computational operations 1412 to control components of the production operations. For example, production well and pipeline data can be analyzed to predict slugging in pipelines leading to a refinery and the computational operations 1412 can control machine operated valves upstream of the refinery to reduce the likelihood of plant disruptions that run the risk of taking the plant offline.

In some implementations of the computational operations 1412, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 14 s. While the requested data need not be displayed (or initiated for display) instantaneously, it is displayed (or initiated for display) without any intentional delay, accounting for processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are in different countries or other jurisdictions.

Figure 15:
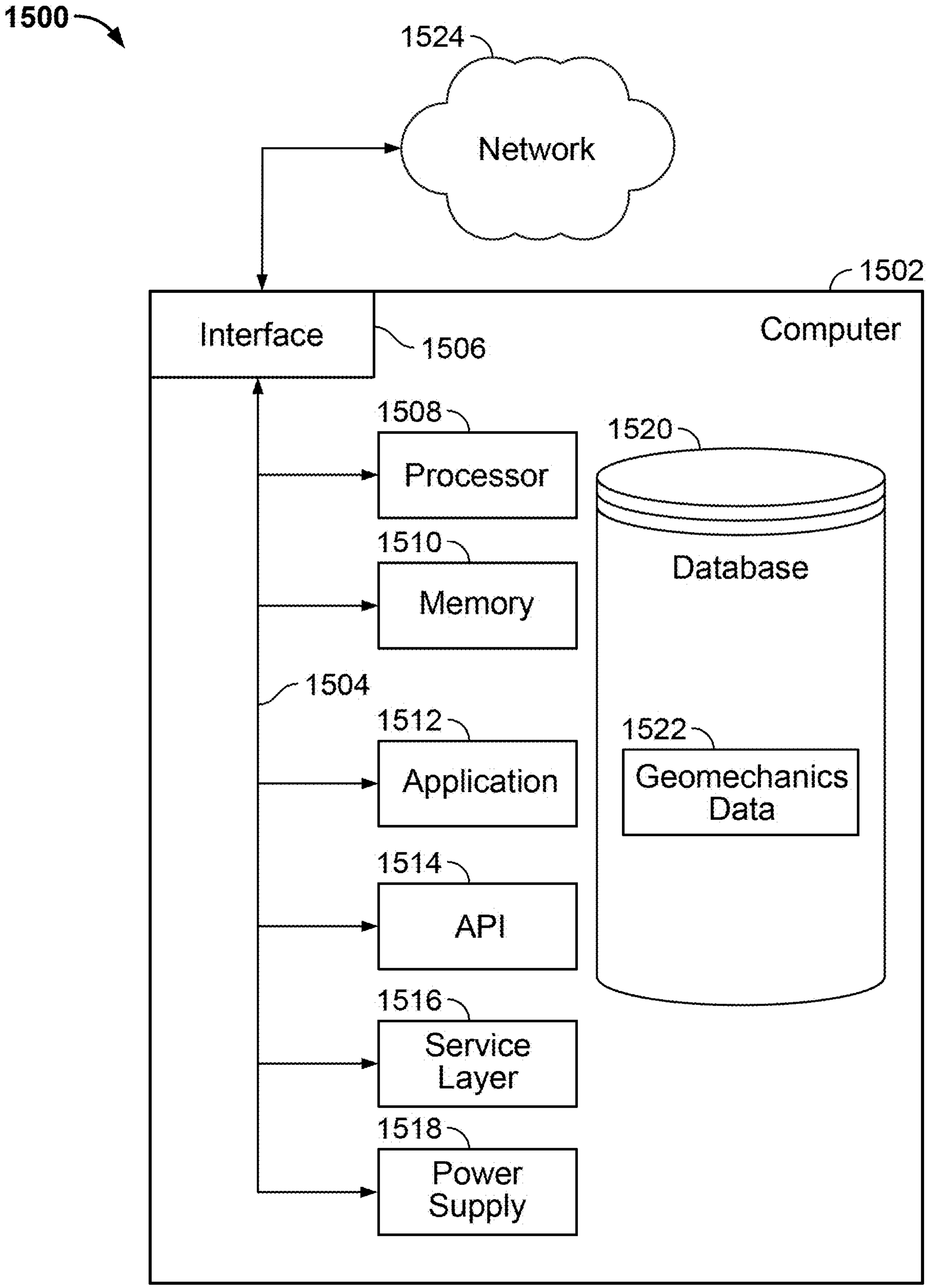
FIG. 15 is a diagram of an example computing system.

FIG. 15 is a block diagram of an example computer system 1500 used to provide computational functionalities associated with described algorithms, methods, functions, processes, flows, and procedures described in the present disclosure, according to some implementations of the present disclosure. The illustrated computer 1502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1502 can include input devices such as keypads, keyboards, and touch screens that can accept user information. Also, the computer 1502 can include output devices that can convey information associated with the operation of the computer 1502. The information can include digital data, visual data, audio information, or a combination of information. The information can be presented in a graphical user interface (UI) (or GUI).

The computer 1502 can serve in a role as a client, a network component, a server, a database, a persistency, or components of a computer system for performing the subject matter described in the present disclosure. The illustrated computer 1502 is communicably coupled with a network 1524. In some implementations, one or more components of the computer 1502 can be configured to operate within different environments, including cloud-computing-based environments, local environments, global environments, and combinations of environments.

At a high level, the computer 1502 is an electronic computing device operable to receive, transmit, process, store, and manage data and information associated with the described subject matter. According to some implementations, the computer 1502 can also include, or be communicably coupled with, an application server, an email server, a web server, a caching server, a streaming data server, or a combination of servers.

The computer 1502 can receive requests over network 1524 from a client application (for example, executing on another computer 1502). The computer 1502 can respond to the received requests by processing the received requests using software applications. Requests can also be sent to the computer 1502 from internal users (for example, from a command console), external (or third) parties, automated applications, entities, individuals, systems, and computers.

Each of the components of the computer 1502 can communicate using a system bus 1504. In some implementations, any or all of the components of the computer 1502, including hardware or software components, can interface with each other or the interface 1506 (or a combination of both), over the system bus 1504. Interfaces can use an application programming interface (API) 1514, a service layer 1516, or a combination of the API 1514 and service layer 1516. The API 1514 can include specifications for routines, data structures, and object classes. The API 1514 can be either computer-language independent or dependent. The API 1514 can refer to a complete interface, a single function, or a set of APIs.

The service layer 1516 can provide software services to the computer 1502 and other components (whether illustrated or not) that are communicably coupled to the computer 1502. The functionality of the computer 1502 can be accessible for all service consumers using this service layer. Software services, such as those provided by the service layer 1516, can provide reusable, defined functionalities through a defined interface. For example, the interface can be software written in JAVA, C++, or a language providing data in extensible markup language (XML) format. While illustrated as an integrated component of the computer 1502, in alternative implementations, the API 1514 or the service layer 1516 can be stand-alone components in relation to other components of the computer 1502 and other components communicably coupled to the computer 1502. Moreover, any or all parts of the API 1514 or the service layer 1516 can be implemented as child or sub-modules of another software module, enterprise application, or hardware module without departing from the scope of the present disclosure.

The computer 1502 includes an interface 1506. Although illustrated as a single interface 1506 in FIG. 15, two or more interfaces 1506 can be used according to implementations of the computer 1502 and the described functionality. The interface 1506 can be used by the computer 1502 for communicating with other systems that are connected to the network 1524 (whether illustrated or not) in a distributed environment. Generally, the interface 1506 can include, or be implemented using, logic encoded in software or hardware (or a combination of software and hardware) operable to communicate with the network 1524. More specifically, the interface 1506 can include software supporting one or more communication protocols associated with communications. As such, the network 1524 or the interface's hardware can be operable to communicate physical signals within and outside of the illustrated computer 1502.

The computer 1502 includes a processor 1508. Although illustrated as a single processor 1508 in FIG. 15, two or more processors 1508 can be used according to implementations of the computer 1502 and the described functionality. Generally, the processor 1508 can execute instructions and can manipulate data to perform the operations of the computer 1502, including operations using algorithms, methods, functions, processes, flows, and procedures as described in the present disclosure.

The computer 1502 also includes a database 1520 that can hold data (such geomechanics data 1522) for the computer 1502 and other components connected to the network 1524 (whether illustrated or not). For example, database 1520 can be in-memory or a database storing data consistent with the present disclosure. In some implementations, database 1520 can be a combination of two or more different database types (for example, hybrid in-memory and conventional databases) according to implementations of the computer 1502 and the described functionality. Although illustrated as a single database 1520 in FIG. 15, two or more databases (of the same, different, or combination of types) can be used according to implementations of the computer 1502 and the described functionality. While database 1520 is illustrated as an internal component of the computer 1502, in alternative implementations, database 1520 can be external to the computer 1502.

The computer 1502 also includes a memory 1510 that can hold data for the computer 1502 or a combination of components connected to the network 1524 (whether illustrated or not). Memory 1510 can store any data consistent with the present disclosure. In some implementations, memory 1510 can be a combination of two or more different types of memory (for example, a combination of semiconductor and magnetic storage) according to implementations of the computer 1502 and the described functionality. Although illustrated as a single memory 1510 in FIG. 15, two or more memories 1510 (of the same, different, or combination of types) can be used according to implementations of the computer 1502 and the described functionality. While memory 1510 is illustrated as an internal component of the computer 1502, in alternative implementations, memory 1510 can be external to the computer 1502.

The application 1512 can be an algorithmic software engine providing functionality according to implementations of the computer 1502 and the described functionality. For example, application 1512 can serve as one or more components, modules, or applications. Further, although illustrated as a single application 1512, the application 1512 can be implemented as multiple applications on the computer 1502. In addition, although illustrated as internal to the computer 1502, in alternative implementations, the application 1512 can be external to the computer 1502.

The computer 1502 can also include a power supply 1518. The power supply 1518 can include a rechargeable or non-rechargeable battery that can be configured to be either user- or non-user-replaceable. In some implementations, the power supply 1518 can include power-conversion and management circuits, including recharging, standby, and power management functionalities. In some implementations, the power-supply 1518 can include a power plug to allow the computer 1502 to be plugged into a wall socket or a power source to, for example, power the computer 1502 or recharge a rechargeable battery.

There can be any number of computers 1502 associated with, or external to, a computer system including the computer 1502, with each computer 1502 communicating over network 1524. Further, the terms "client," "user," and other appropriate terminology can be used interchangeably, as appropriate, without departing from the scope of the present disclosure. Moreover, the present disclosure contemplates that many users can use one computer 1502 and one user can use multiple computers 1502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Several implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Several embodiments of these systems and methods have been described. Nevertheless, it will be understood that various modifications may be made without departing from the spirit and scope of this disclosure. Accordingly, other embodiments are within the scope of the following claims.

Several embodiments have been described. Nevertheless, it will be understood that various modifications may be made without departing from the scope of the data processing system described herein. Accordingly, other embodiments are within the scope of the following claims.

What is claimed is:

1. A method for determining a volume of a wellbore for hydrocarbon extraction in a subsurface, the method comprising:

for each of a plurality of depths in the wellbore, obtaining image data comprising, an image representing subsurface properties around a casing in the wellbore;

calibrating the image data including the image, the calibrating configured to adjust at least one subsurface property assigned to at least one pixel in the image;

determining, from the adjusted subsurface property for the image, a radial measurement of a cross section of the wellbore at a given depth;

generating, based on the cross section of the wellbore at the given depth, a three-dimensional model of the wellbore;

determining, based on the three-dimensional model, a volume comprising a space between the wellbore and a predicted location of a casing inside the wellbore; and determining, based on the volume, an amount of material to fill the volume for sealing the casing when the casing is placed inside the wellbore.

2. The method of claim 1, wherein the image data comprise at least a portion of logging-while-drilling (LWD) data obtained during drilling of the wellbore into the subsurface.

3. The method of claim 1, further comprising:

determining a bit size of a bit configured to drill the wellbore; and calibrating the image data by assigning a physical dimension to pixel sizes in the images based on the bit size of the bit.

4. The method of claim 1, further comprising:

determining a direction of a maximum in-situ stress in the wellbore; and calibrating the image data by correlating the direction of the maximum in-situ stress with directions of wellbore enlargements or breakouts represented in the image data.

5. The method of claim 1, further comprising:

receiving a multi-arm mechanical caliper log measurement; and calibrating the image data by determining a radial depth corresponding to a breakout zone represented in the image data.

6. The method of claim 1, wherein the image data comprise ultrasonic log images.

7. The method of claim 1, wherein the image data comprise resistivity log images, the method further comprising:

determining a range of circumferential angles with low image resolution; and calibrating the image data by correlating a region of low image resolution with a wellbore enlargement.

8. A system for determining a volume of a wellbore for hydrocarbon extraction in a subsurface, the system comprising:

at least one processor; and a memory storing instructions that, when executed by the at least one processor, cause the at least one processor to perform operations comprising:

obtaining image data comprising, an image representing subsurface properties around a casing in the wellbore;

calibrating the image data including the image, the calibrating configured to adjust at least one subsurface property assigned to at least one pixel in the image;

determining, from the adjusted subsurface property for the image, a radial measurement of a cross section of the wellbore at a given depth;

generating, based on the cross section of the wellbore at the given depth, a three-dimensional model of the wellbore;

determining, based on the three-dimensional model, a volume comprising a space between the wellbore and a predicted location of a casing inside the wellbore; and determining, based on the volume, an amount of material to fill the volume for sealing the casing when the casing is placed inside the wellbore.

9. The system of claim 8, wherein the image data comprise at least a portion of logging-while-drilling (LWD) data obtained during drilling of the wellbore into the subsurface.

10. The system of claim 8, the operations further comprising:

determining a bit size of a bit configured to drill the wellbore; and calibrating the image data by assigning a physical dimension to pixel sizes in the images based on the bit size of the bit.

11. The system of claim 8, the operations further comprising:

determining a direction of a maximum in-situ stress in the wellbore; and calibrating the image data by correlating the direction of the maximum in-situ stress with directions of wellbore enlargements or breakouts represented in the image data.

12. The system of claim 8, the operations further comprising:

receiving a multi-arm mechanical caliper log measurement; and calibrating the image data by determining a radial depth corresponding to a breakout zone represented in the image data.

13. The system of claim 8, wherein the image data comprise ultrasonic log images.

14. The system of claim 8, wherein the image data comprise resistivity log images, the operations further comprising:

determining a range of circumferential angles with low image resolution; and calibrating the image data by correlating a region of low image resolution with a wellbore enlargement.

15. One or more non-transitory computer readable media storing instructions that, when executed by at least one processor, cause the at least one processor to determine a volume of a wellbore for hydrocarbon extraction in a subsurface by performing operations comprising:

obtaining image data comprising, an image representing subsurface properties around a casing in the wellbore;

calibrating the image data including the image, the calibrating configured to adjust at least one subsurface property assigned to at least one pixel in the image;

determining, from the adjusted subsurface property for the image, a radial measurement of a cross section of the wellbore at a given depth;

generating, based on the cross section of the wellbore at the given depth, a three-dimensional model of the wellbore;

determining, based on the three-dimensional model, a volume comprising a space between the wellbore and a predicted location of a casing inside the wellbore; and determining, based on the volume, an amount of material to fill the volume for sealing the casing when the casing is placed inside the wellbore.

16. The one or more non-transitory computer readable media of claim 15, wherein the image data comprise at least a portion of logging-while-drilling (LWD) data obtained during drilling of the wellbore into the subsurface.

17. The one or more non-transitory computer readable media of claim 15, the operations further comprising:

determining a bit size of a bit configured to drill the wellbore; and calibrating the image data by assigning a physical dimension to pixel sizes in the images based on the bit size of the bit.

18. The one or more non-transitory computer readable media of claim 15, the operations further comprising:

determining a direction of a maximum in-situ stress in the wellbore; and calibrating the image data by correlating the direction of the maximum in-situ stress with directions of wellbore enlargements or breakouts represented in the image data.

19. The one or more non-transitory computer readable media of claim 15, the operations further comprising:

receiving a multi-arm mechanical caliper log measurement; and calibrating the image data by determining a radial depth corresponding to a breakout zone represented in the image data.

20. The one or more non-transitory computer readable media of claim 15, wherein the image data comprise resistivity log images, the operations further comprising:

determining a range of circumferential angles with low image resolution; and calibrating the image data by correlating a region of low image resolution with a wellbore enlargement.

* * * * *